United States Patent [19]

Goto

[11] Patent Number: 5,565,957
[45] Date of Patent: Oct. 15, 1996

[54] CAMERA

[75] Inventor: Tetsuro Goto, Funabashi, Japan

[73] Assignee: Nikon Corporation, Tokyo, Japan

[21] Appl. No.: 362,782

[22] Filed: Dec. 23, 1994

[30]    Foreign Application Priority Data

| Dec. 27, 1993 | [JP] | Japan | 5-330452 |
| Dec. 27, 1993 | [JP] | Japan | 5-330453 |
| Mar. 4, 1994 | [JP] | Japan | 6-034777 |
| Mar. 22, 1994 | [JP] | Japan | 6-050653 |

[51] Int. Cl.$^6$ ..................................................... G03B 17/00
[52] U.S. Cl. ............................. 396/48; 396/300; 396/301
[58] Field of Search ...................................... 354/412, 484

[56]    References Cited

U.S. PATENT DOCUMENTS

| 4,853,733 | 8/1989 | Watanabe et al. | 354/412 |
| 5,278,604 | 1/1994 | Nakamura | 354/412 |
| 5,300,978 | 4/1994 | Miyasaka | 354/412 |

*Primary Examiner*—W. B. Perkey

[57]    ABSTRACT

Disclosed is a camera comprising, a microcomputer, an electrically erasable and programmable large-capacity memory for storing a control program for indicating an operation of the microcomputer, and a terminal, exposed to outside, through which at least one of commands and program data relative to erasing and rewriting to the large-capacity memory is transmitted. Preferably, the microcomputer has a read-only memory which stores the control program for indicating a transfer of at least one of the received commands and program data to the large-capacity memory but is separate from the large-capacity memory.

44 Claims, 25 Drawing Sheets

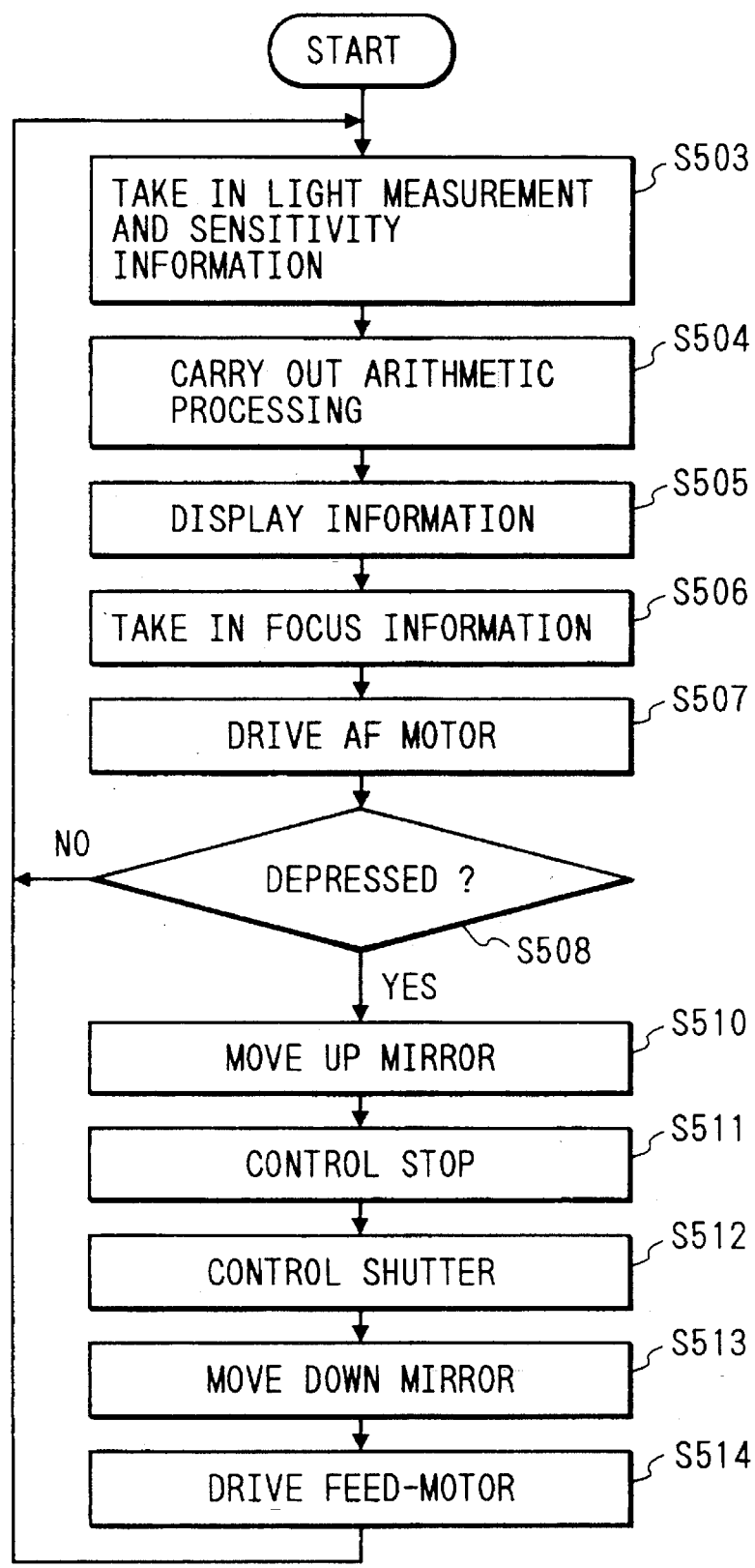

CAMERA

BACKGROUND OF THE INVENTION

1. Field of the Invention

The present invention relates to a camera including a large capacity memory rewritable from outside.

2. Related Background Art

With an advancement of an electronic camera, a high-function microcomputer (hereinafter simply termed a CPU) has hitherto performed processing in order to execute an auto exposure, focusing, a feed of a film and electronic flash control.

Take the auto exposure for example, and the explanation goes as follows. To start with, there is read an object luminance signal from a light metering sensor incorporated into the camera and a sensitivity signal of the film loaded therein. A calculation of values thereof is executed based on an arithmetic method stored beforehand in a ROM, thereby obtaining a proper exposure condition. Then, a photographer is notified of a result of this by outputting a signal to a display unit provided outwardly of the CPU. Further, when depressing a shutter button, a control signal is transmitted to an external actuator so that a stop value of a lens and an aperture time of a shutter are obtained as indicated by the arithmetic result.

As well known, such a CPU is of a so-called one-chip type, and the interior thereof is provided with an I/O control unit, a read-only memory (hereinafter abbreviated to a ROM) for storing a processing content and a processing sequence, a random access memory (hereinafter abbreviated to a RAM) for temporarily storing inputted signals and a logic unit for executing calculations.

As well, the ROM (referred to as a mask ROM) in the CPU is manufactured in accordance with a processing program in a mask step of its manufacturing process, and hence it is absolutely impossible to make a change after being manufactured. If a mistake in the processing program is found out, or if a higher degree of arithmetic program corresponding to a sensor exhibiting a higher performance is to be used, or if the processing program is changed for such a reason that a specification of the actuator is modified, the CPU itself is newly remanufactured before the manufacturing process, and, further, the CPU has to be re-mounted on a circuit board within the camera by soldering.

Also, a so-called one-time CPU transiently employed at an initial stage of the product such as a trial product does not have to undergo the manufacturing process as in the case of a mask ROM because of being electrically rewritable to the internal ROM. It is impossible, though there exists the potential that the processing program can be confirmed at an early stage, to erase the written processing program a just as it is impossible to do so in the mask ROM and to perform a repetitive usage. Besides, the remounting by soldering is also needed.

On the other hand, a flash memory (hereinafter abbreviated to an FM) has been developed in recent years. The FM is similar to an EEPROM wherein electrical writing and erasing processes can be repeatedly performed. However, an internal structure thereof is simple, and, hence, a large-capacity memory can be formed on a small chip. Then, a storage on the order of several tens or more of kilobytes as in the processing program for indicating the operation of the CPU is conceived easily.

As explained above, there is the purpose for enhancing the performance in the camera, but, nevertheless, there still exists a problem such that it is impossible to quickly change the processing program within the ROM.

SUMMARY OF THE INVENTION

It is a primary object of the present invention to provide a camera capable of easily changing a processing program according to the necessity.

To accomplish the above object, according to a first aspect of the present invention, there is provided a camera comprising: a microcomputer; an electrically erasable and programmable large-capacity memory for storing a control program for indicating an operation of the microcomputer; and a terminal, exposed to outside, through which at least one of commands and program data relative to erasing and rewriting to the large-capacity memory is transmitted.

Preferably, the microcomputer has a read-only memory which stores the control program for indicating a transfer of at least one of the received commands and program data to the large-capacity memory but is separate from the large-capacity memory.

According to a second aspect of the present invention, there is provided a camera comprising: a microcomputer incorporating an electrically erasable and programmable large-capacity memory area for storing a control program for indicating an operation; and a terminal, exposed to outside, through which at least one of commands and program data relative to erasing and rewriting to the large-capacity memory area is transmitted.

Preferably, the microcomputer has a read-only memory area which stores the control program for indicating a transfer of at least one of the received commands and program data to the large-capacity memory area.

According to a third aspect of the present invention, there is provided a camera comprising: a microcomputer; an electrically erasable and programmable large-capacity memory for storing a control program for indicating an operation of the microcomputer; a terminal, exposed to outside, through which at least one of commands and program data relative to erasing and rewriting to the large-capacity memory is transmitted; and a power supply circuit used, when performing photography, for the operation of the microcomputer and a reading operation from the large-capacity memory and also used for supplying the electric power needed when writing at least one of the commands and the program data to the large-capacity memory.

Preferably, the switching unit brought into a conductive status only when writing at least one of the commands and the program data to the large-capacity memory is provided between the power supply circuit and a power supply terminal of the large-capacity memory.

In the first through third aspects of the present invention, the camera incorporates the repeatedly rewritable large-capacity memory, and, therefore, an effective program of the CPU can be readily changed.

Further, the power supply required when erasing and rewriting the program in the memory can involve the use of an output from a DC/DC converter originally used in the camera.

Moreover, the electric power for the memory is applied when needed. Also, the processing program to be stored in the memory can be received via existing terminals already disposed in the camera.

According to a fourth aspect of the present invention, there is provided a camera comprising: a microcomputer; an electrically erasable and programmable large-capacity memory for storing a control program for indicating an operation of the microcomputer; a terminal, exposed to outside, through which at least one of commands and program data relative to erasing and rewriting to the large-capacity memory is transmitted; and a power supply terminal required for erasing and rewriting to the large-capacity memory.

According to a fifth aspect of the present invention, there is provided a camera comprising: a microcomputer; an electrically erasable and programmable large-capacity memory for storing a control program for indicating an operation of the microcomputer; a terminal, exposed to outside, through which at least one of commands and program data relative to erasing and rewriting to the large-capacity memory is transmitted; a unit for detecting whether or not there exists a power supply needed for erasing and rewriting to the large-capacity memory; and a unit for controlling the erasing and rewriting to the large-capacity memory in accordance with an output of the detecting unit.

According to a sixth aspect of the present invention, there is provided a camera comprising: a microcomputer; an electrically erasable and programmable large-capacity memory for storing a control program for indicating fundamental processing of the microcomputer; a small-capacity memory for storing a processing instruction relative to the erasing and rewriting to the large-capacity memory; and a terminal, exposed to outside, through which at least one of commands and program data relative to erasing and rewriting to the large-capacity memory is transmitted.

According to a seventh aspect of the present invention, there is provided a camera comprising: a microcomputer; an electrically erasable and programmable large-capacity memory for storing a control program for indicating a part of fundamental processing of the microcomputer; a small-capacity memory for storing a processing instruction relative to erasing and rewriting to the large-capacity memory and a control program for indicating a part of remaining fundamental processing of the microcomputer; and a terminal, exposed to outside, through which at least one of commands and program data relative to the erasing and rewriting to the large-capacity memory is transmitted.

According to an eighth aspect of the present invention, there is provided a camera comprising: a microcomputer; a memory for temporarily storing data inputted and outputted to the microcomputer; an electrically erasable and programmable large-capacity memory for storing a control program for indicating an operation of the microcomputer; a terminal, exposed to outside, through which at least one of commands and program data relative to erasing and rewriting to the large-capacity memory; and a read-only memory for storing, after the temporary storage memory has temporarily stored at least one of the inputted commands and the inputted program data, a sequence of transferring and storing one of them to and in the large-capacity memory.

Preferably, the electric erasing and rewriting to the large-capacity memory are performed by use of any one of an external power supply or a power supply built in the camera.

In the fourth through eighth aspects of the present invention, there is supplied the electric power required for the operation only when executing the erasure or the rewriting to the memory. Further, a voltage of the power source which is supplied for the above purpose is detected, and, only when it reaches a predetermined voltage, the erasure or the rewriting is carried out.

Further, the processing circuit within the camera is provided with the ROM including only processing procedures needed for erasing or rewriting the processing program data from or to the memory. In addition, the processing program transferred from outside is stored in a flash memory (FM) via a temporary storage memory.

According to a ninth aspect of the present invention, there is provided a camera having a photographing unit, a photographing operation of which is controlled, the camera comprising: a storage unit for storing control data for instructing at least the photographing operation; a control unit for controlling the photographing unit in accordance with the control data by reading the control data; a connecting portion for a connection to an external circuit; and a selecting unit for selectively connecting the storage unit to at least one of the connecting portion and the control unit.

Preferably, the camera further comprises a connection detecting unit for detecting the connection of the external circuit to the connecting portion. The connecting portion includes a plurality of terminals, and the selecting unit changes a connection target in accordance with a result of the detection by the detecting unit.

Preferably, the selecting unit may change the connection target in accordance with a signal inputted to a certain specified terminal conceived as a predetermined terminal among the terminals. In this case, preferably, the storage unit is so constructed as to be operable with the signal inputted through the specified terminal serving as a power supply.

Preferably, the storage unit is capable of electrically repeatedly rewriting the control data. The storage unit is preferably capable of batch-erasing contents stored therein. Preferably, the storage unit is a flash memory.

The connecting portion includes a plurality of terminals. These terminals may be disposed separately in at least two or more areas.

The camera is so constructed as to be connectable to at least one of a remote control device for remote-controlling the camera and a databack device for recording a desired item of data on a film. The connecting portion for the connection to the external circuit may serve as at least one of a connecting portion for a connection to the remote control device and a connecting portion for a connection to the databack.

The connecting portion may be so disposed as to be exposed to outside.

Preferably, the camera further comprises an openable/closable cover member for covering the connecting portion.

Further, the camera further comprises an externally controllable built-in power supply. The built-in power supply may be used for rewriting the control data in the storage unit. In addition, preferably, the camera further comprises a removable cover member for covering the connecting portion.

The connecting portion for the connection to the external circuit is constructed of a plurality of terminals. These terminals may be employed also as accessary terminals.

The selecting unit is preferably constructed of an analog switch.

In the ninth aspect of the present invention, when a predetermined signal is inputted to the specified terminal from the external circuit, the selecting unit detects this and changes the connecting target. Alternatively, when the external circuit detects that the external circuit is connected, the selecting unit changes the connecting target, corresponding to this detection.

Further, in a state where the storage unit (e.g., the flash memory) is connected to the terminals, the external circuit is capable of writing the control data to the storage unit without passing through the control unit. On the other hand, in a state where the storage unit is connected to the control unit, the control unit is capable of executing the control of the photographing unit by reading the control data from the storage unit.

According to a tenth aspect of the present invention, there is provided a camera having photographing unit, a photographing operation of which is controlled, the camera comprising: a storage unit for inputting and outputting data in parallel in order to store control data for instructing at least the photographing operation; a control unit for controlling the photographing unit in accordance with the control data by reading the control data; a connecting portion for a connection to an external circuit; and a serial/parallel converting unit for converting a serial signal inputted and outputted via the connecting portion into a parallel signal and outputting the parallel signal to the storage unit.

Preferably, the camera further comprises a selecting unit for selectively connecting the connecting portion to one of the storage unit and the control unit.

Additionally, the camera further comprises: a connection detecting unit for detecting the connection of the external circuit to the connecting portion. The connecting portion is constructed of a plurality of terminals. Preferably, the selecting unit changes a connecting target in accordance with a result of the detection by the detecting unit.

Also, the selecting unit may change the connecting target in accordance with a signal inputted to a certain specified terminal conceived as a predetermined terminal among the terminals.

Preferably, the storage unit is so constructed as to be capable of the rewriting operation with the signal inputted via the specified terminal serving as a power supply.

The camera may be so constructed as to be connectable to at least one of a remote control device for remote-controlling the camera and a databack device for recording a desired item of data on a film. The connecting portion for the connection to the external circuit may serve as at least one of a connecting portion for a connection to the remote control device and a connecting portion for a connection to the databack.

The connecting portion may be so disposed as to be exposed to outside.

Preferably, the storage unit is capable of electrically repeatedly rewriting the control data. Further, the storage unit is preferably capable of batch-erasing contents stored therein. Moreover, the storage unit is preferably a flash memory.

In the tenth aspect of the present invention, when the predetermined signal is inputted to the specified terminal from the external circuit (or when the detecting unit detects that the external circuit is connected), the selecting unit changes the connecting target, corresponding to this detection.

In the state where the terminals are connected to the storage unit (e.g., the flash memory), the external circuit is capable of writing the control data to the storage unit without passing through the control unit. In this case, a serial signal inputted from the terminal is converted into a parallel signal by the serial/parallel converting unit and thereafter outputted to the storage unit. On the other hand, in a state where the terminals are connected to the control unit, the control unit is capable of transferring and receiving the signals to the external circuit via the terminals.

The above and other objects, features and advantages of the present invention are explained hereinafter and may be better understood by reference to the drawings and the descriptive matter which follows.

BRIEF DESCRIPTION OF THE DRAWINGS

FIG. 31 is a flowchart showing a processing routine by the CPU in FIG. 26.

DETAILED DESCRIPTION OF THE PREFERRED EMBODIMENTS

Figure 1:
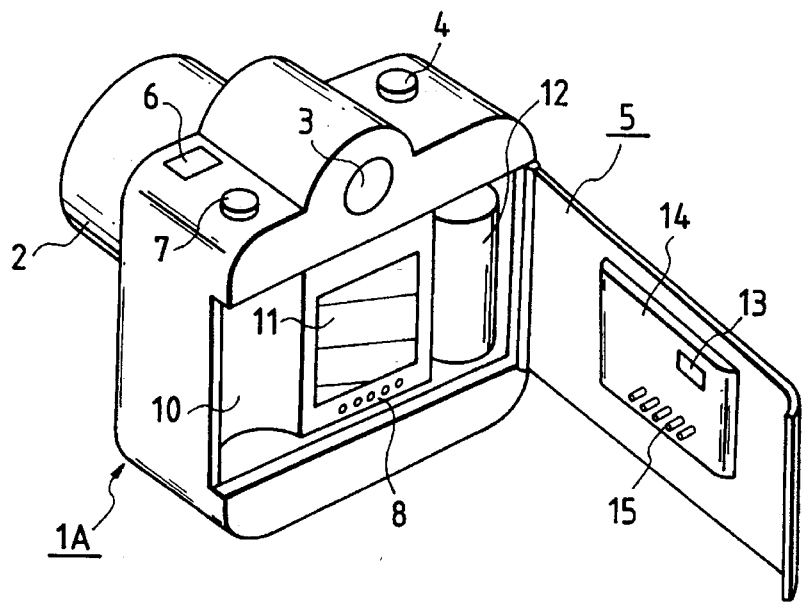
FIG. 1 is a perspective view illustrating a camera according to the present invention.

Referring now to the drawings wherein like reference numerals designate corresponding or similar elements throughout the several views, there is shown in FIG. 1 a camera 1A according to the present invention.

The camera 1A is in a state where a lens 2 is mounted thereon, and a databack 5 serving as a rear cover is opened. An unillustrated film Patrone is loaded in a Patrone chamber 10. A film drawn out the Patrone passes by the front surface of a shutter 11 and is wound on a spool 12. The film is fed by a motor 36 (see FIG. 2) incorporated into the interior of the spool 12.

As well, a photographer visually recognizes a state of an object passing through the lens 2 from a finder 3 and issues a command to start an exposure by depressing a release button 4.

An exposure mode and a variety of conditions can be confirmed by an LCD 6.

A button 7 is an operation button for arbitrarily setting the exposure mode, a photographing condition, etc. of the camera 1. The operation thereof is conducted while confirming characters or the like on the LCD 6.

A string-of-terminal 8 consisting of terminals 8A to 8E (FIG. 2) is provided downwardly of the shutter 11.

A presser plate 14 provided inwardly of the databack acts to hold a planarity by pushing the unillustrated film against an aperture and, at the same time, has a hole 13 for optically recording a various items of data on the film.

A string-of-contact 15 is arranged in a position corresponding to the string-of-terminal 8. When closing the databack 5, the string-of-terminal 8 and the string-of-contact 15 contact each other, thereby forming an electric circuit for transferring and receiving data which will be mentioned later.

Figure 2:
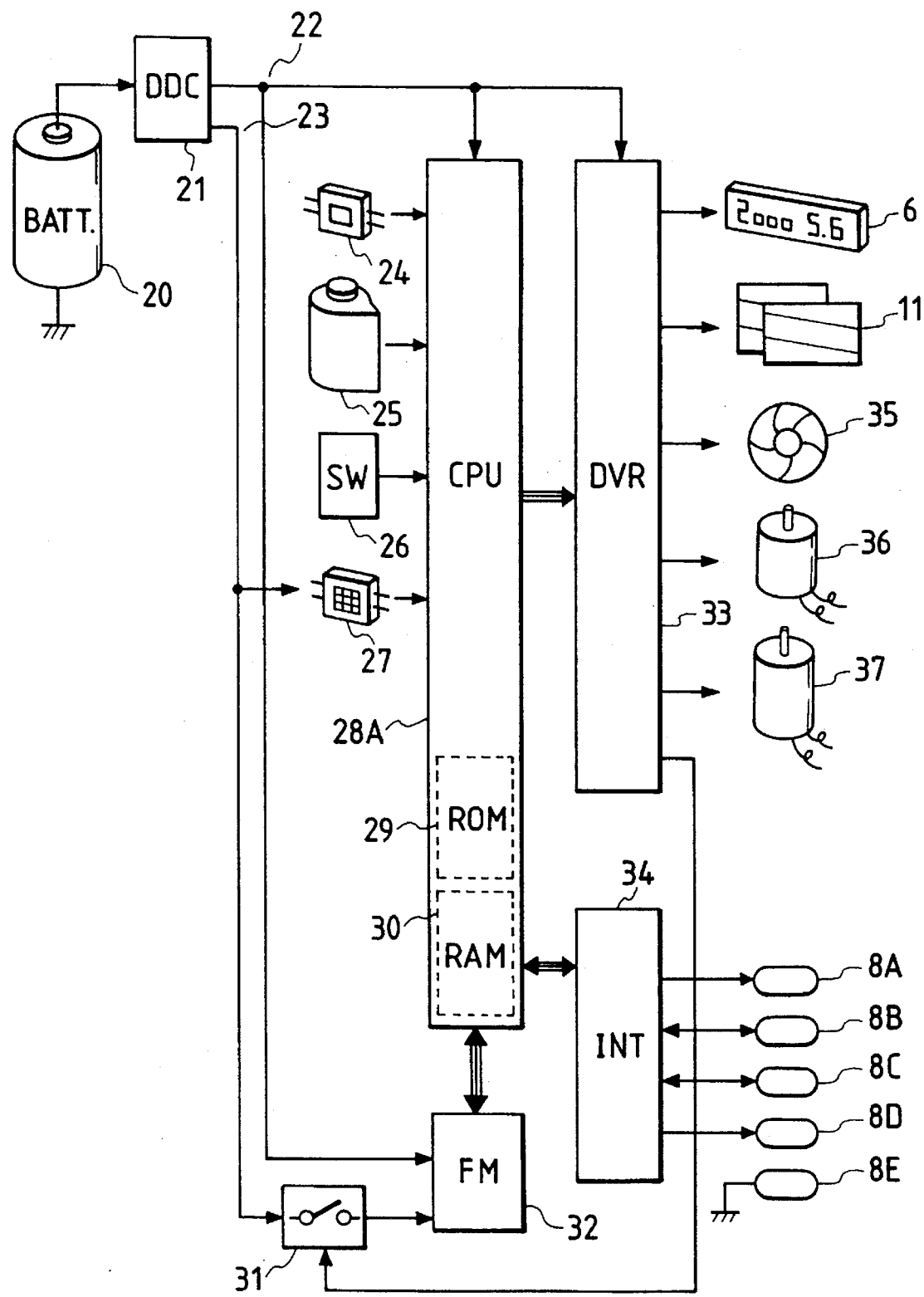
FIG. 2 is a block diagram illustrating an electric circuit in a first embodiment of the camera according to the present invention.

Referring next to FIG. 2, the electric circuit in the first embodiment of the present invention will be explained.

The circuit illustrated in FIG. 2 involves the use of a flash memory (FM 32) as a large capacity memory. Note that the flash memory indicates a nonvolatile memory satisfying conditions such as (1) a repetitive execution of electrical erasing/writing processes, (2) a batch erasure or block-unit (several bytes or several tens of bytes) erasure and (3) a storage capacity enough to store a control program. In terms of a memory structure, although there are various types of memories such as a NAND type, a NOR type, an AND type and many other types derived therefrom, the present specification includes all these types of memories.

This electric circuit is operated when supplied with electric power from a DC/DC converter 21 serving as a power supply.

The DC/DC converter 21 has 2-system voltage outputs 22, 23. The voltage 22 is on the order of 5 V in this embodiment and employed for driving a variety of control circuits inclusive of a CPU 28A and an FM 32 that will be discussed later. Further, the voltage 23 is approximately 12 V in this embodiment and is used for driving the FM 32 via a switching unit 31 as well as driving a focus detection unit 27 that will hereinafter be explained.

The following is an explanation of signals inputted to a CPU 28A for executing the central control.

To start with, a light metering unit 24 is a known sensor unit constructed of a photo diode for measuring a brightness of the object, and an item of photometric value data is inputted to the CPU 28A.

A film sensitivity detection unit 25 reads an item of coded sensitivity data recorded on a side surface of the loaded film Patrone, and an item of film sensitivity data is inputted to the CPU 28A.

A switch detection unit 26 includes a timing switch for detecting a sequence status of the camera as well as including manual operation switches inclusive of switches interlocking with the above release button 4 and the mode setting button 7. All items of status data of the camera are inputted to the CPU 28A.

The focus detection unit 27 is a known sensor constructed of a CCD for measuring an in-focus state of the object, and an item of focusing value data is inputted to the CPU 28A.

An output from the CPU 28A is given via a driver unit 33 and works to execute the following drive.

An LCD 6 is driven to display pieces of data about an exposure, setting of an operation mode and warning.

The shutter 11 is controlled to give a predetermined exposure time on a film surface.

A quantity of transmitted light from the object is regulated by driving a stop 35 provided within the lens 2 which will be explained later.

Winding, rewinding and feeding of the film are controlled by driving the motor 36. Operation timings thereof are based on signals transmitted from the switch detection unit 26.

A lens unit in the lens 2 which will be stated later is moved by driving a motor 37 and controlled so that the object is focalized.

The switching unit 31 is ON/OFF-controlled.

Further, the CPU 28A performs data communications with the above-mentioned databack 5 or a program rewrite device 50A through an interface circuit 34 and terminals 8A to 8E via a plurality of signal lines.

The following is a detailed discussion on the elements in accordance with the first embodiment of the present invention in FIG. 2.

The CPU 28A incorporates a read-only memory ROM 29, a read/write RAM 30, though not illustrated, a logic arithmetic unit and an AD converter into its interior and executes predetermined processing. Further, the CPU 28A receives a processing program stored in the FM 32 via a plurality of lines and executes the control in conformity with processing program. These processes will be described with reference to a flowchart of FIG. 5.

The CPU 28A executes transferring and receiving of the following signals via the interface circuit 34. At first, a serial communication line is formed via the terminals 8A to 8C. A unidirectional transmission of a clock signal from the camera 1A is carried out via the terminal 8A. Executed then are bidirectional transferring and receiving of a handshake signal via the terminal 8B and a data signal via the terminal 8C. Note that there have been known the configuration of the above serial communications line and the above detailed items of data.

Also, a data recording signal is transmitted via the terminal 8D to the databack 5. The data recording signal is a signal generated corresponding to a timing of starting the exposure operation. A data recording operation by the databack 5, which will be described later, is executed with this signal being a trigger.

Further, as will be discussed hereinbelow, the terminals 8A to 8E are connected also to the program rewrite device 50A, (see FIG. 4) thus transferring and receiving various signals.

In this case, the processing program within the FM 32 is erased and rewritten based on an operation signal of the rewrite device 50A.

The switching unit 31 is provided for selectively transmitting the voltage output 23 of the DC/DC converter 21 to the FM 32 at an arbitrary point of time. The switching unit 31 is, as will be described later, so controlled as to be brought into a conductive state only when erasing or writing the program to the FM 32. Note that the switching unit 31, though illustrated like a mechanical switch in the Figure, may be a semiconductor-based switching element such as a transistor and an FET.

Figure 3:
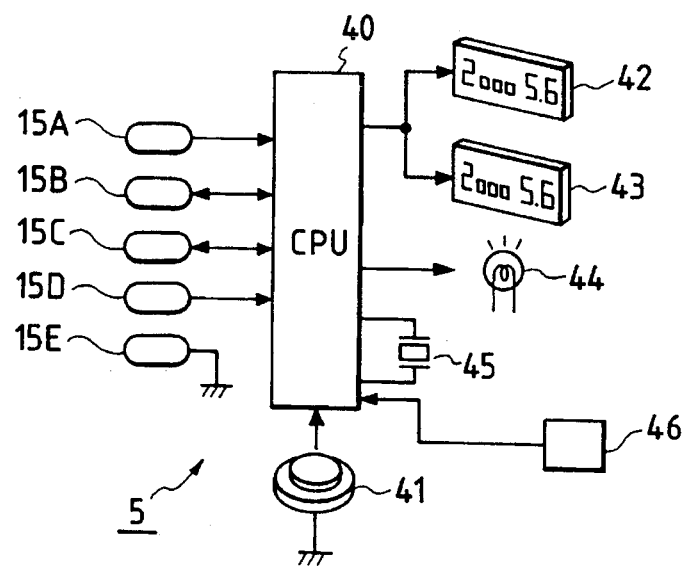
FIG. 3 is a block diagram showing an electric circuit within a databack mounted in the camera of this invention.

FIG. 3 illustrates an electric circuit within the databack 5.

The databack 5 incorporates a function to record one of two kinds of data, i.e., an item of time data on year, month and date and an item of exposure data transmitted from the camera 1A.

A CPU 40, with a battery 41 serving as a driving source, controls the central function. Timer data can be obtained by counting a constant frequency at all times from an oscillator 45 connected as a timer function.

The exposure data is indicated by a data communications function through the terminals 15A to 15E from the camera 1A. The terminal 15D receives a data record timing signal. An operation switch 46 mounted on the surface of the databack 5 is capable of selecting which data to record, and a content thereof can be confirmed on the LCD 42.

Herein, the display content on the LCD 42 is also expressed substantially unchanged on a data-record LCD 43. The LCD 43 is exposed from the hole 13 formed in the presser plate 14 described above. A lamp 44 is lit up for a predetermined time at a timing of the data-record signal, thereby recording the display content on the LCD 43 on the film as it is.

Figure 4:
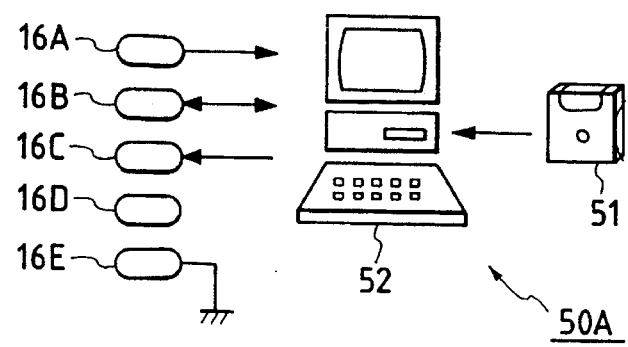
FIG. 4 is a conceptual diagram showing a program rewrite device in the first embodiment of the camera according to this invention.

FIG. 4 is a conceptual diagram illustrating the program rewrite device 50A for erasing and writing the processing program from and to the FM 32 within the camera 1A.

A processing sequence of the rewriting operation and the processing program to be written to the FM 32 are stored on a floppy disc (hereinafter abbreviated to FD) 51, wherein the main device is a personal computer 52. As well known, the personal computer 52 executes the operation thereof in accordance with the data on the FD 51.

The rewrite device 50A has terminals 16A to 16E, thereby transmitting and receiving a rewrite command and the processing program in contact with the string-of-terminal 8 of the camera 1A. Note that the rewrite device 50A is unrelated to the data record operation, and, therefore, the terminal 16D has no function.

When rewriting the processing program of the FM 32 within the camera 1A, the personal computer 52 is connected via the terminals 16A to 16E to the camera 1A, and the personal computer 52 may be operated based on the FD 51.

Figure 5:
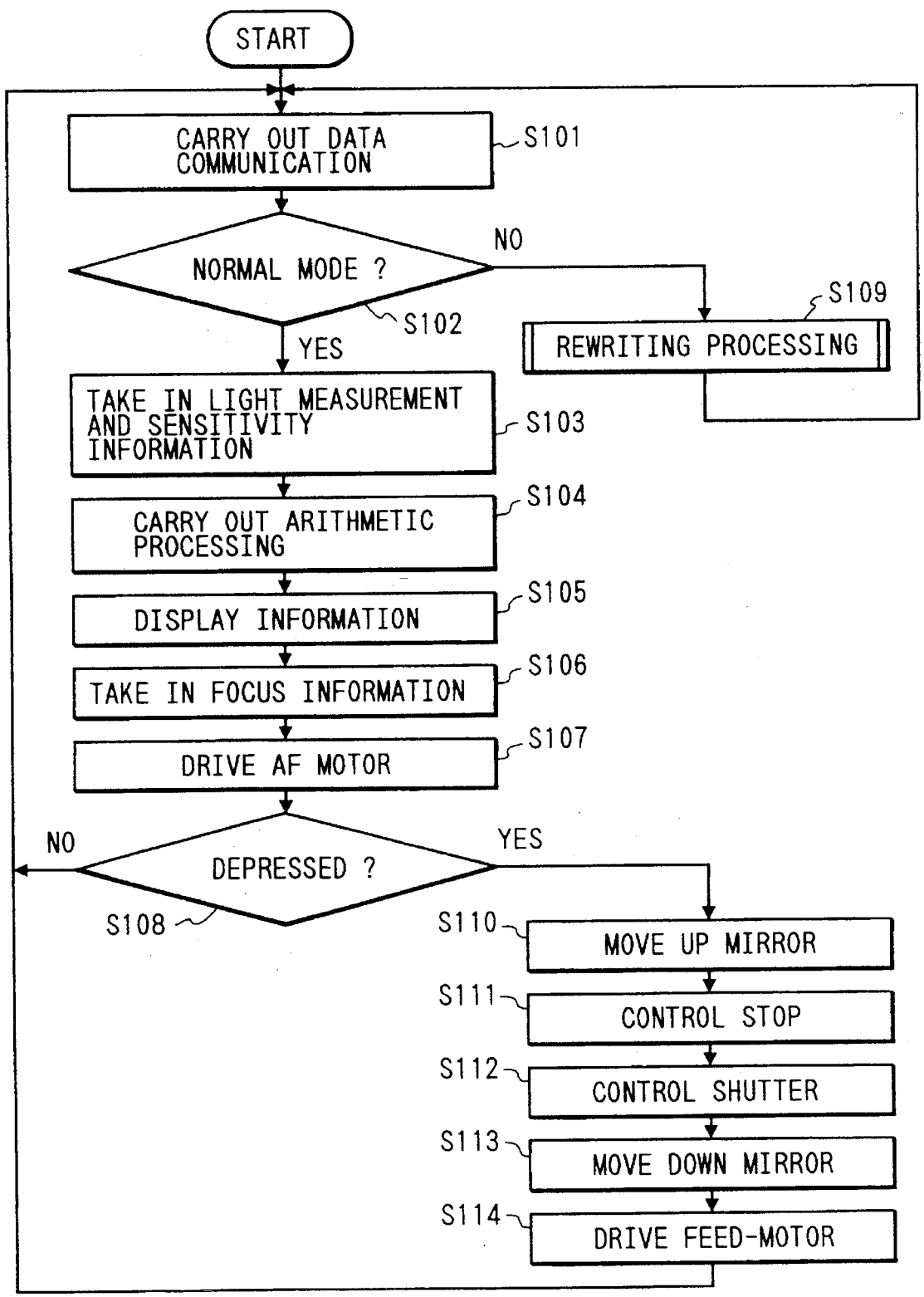
FIG. 5 is a flowchart showing a processing routine by a CPU in FIG. 2.

FIG. 5 shows a processing routine by the CPU 28A of FIG. 2.

This routine is repeatedly executed for a duration of a power supply.

In step S101, the data communications are carried out via the terminals 8A to 8E. The data communications are established even when either the databack 5 or the rewrite device 50A is mounted, but the data received by the CPU 28A contains an item of identification data of a transmission side.

Determined based on the received data in step S102 is whether in a normal mode or not, i.e., whether the databack 5 or the rewrite device 50A is mounted. If the answer is Yes, viz., when the identification data indicates the databack 5, the operation shifts to the normal processing in step S103 and steps subsequent thereto. Whereas if the answer is No, i.e., when the identification data indicates the rewrite device 50A, the operation shifts to a rewrite processing routine in step S109. Step S109 will be explained with reference to FIG. 6.

In step S103, the photometric data and the sensitivity data are taken in from the light metering unit and the sensitivity detection unit 25.

In step S104, the two items of data obtained in step S103 undergo arithmetic processing on the basis of a set exposure mode, thus calculating a shutter time and a stop value that are defined as proper exposure conditions.

In step S105, the exposure data or the mode data obtained in step S104 is displayed on the LCD 6.

In step S106, in-focus data of the object is taken in from the focus-detection unit 27.

In step S107, the motor 37 is driven based on the in-focus data, and a lens unit of the lens 2 is moved, thus bringing the object into focus.

Determined in step S108 is whether or not the release button 4 is depressed through the switch detection unit 26. If not depressed, the operation returns to step S101, wherein the above processes are repeated.

In step S110, the release button 4 is depressed, and hence, to start with, an unillustrated reflecting mirror is moved up off a photographing optical path.

In step S111, the stop 35 is regulated to have a predetermined stop aperture.

In step S112, the shutter 11 is opened for a predetermined time and then closed, thus regulating the exposure on the film.

In step S113, the exposing operation is completed, and, therefore, the unillustrated reflecting mirror is moved down.

In step S114, the motor 36 is rotated forward to feed the film and to energize the mechanism.

Since the exposure operation makes one cycle so far, the operation goes back to step S101, wherein the above processes are repeated.

Figure 6:
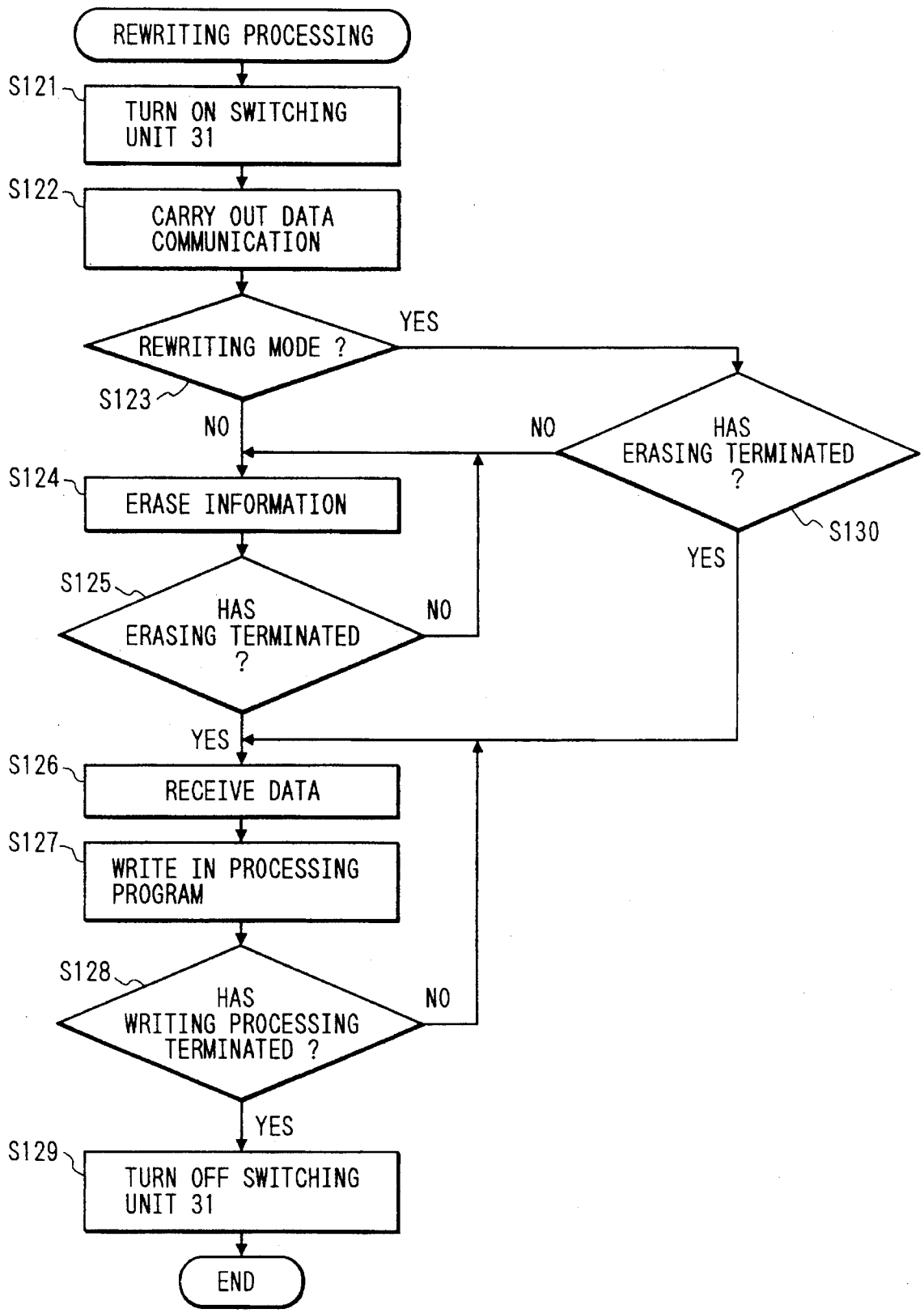
FIG. 6 is a flowchart showing a rewrite processing routine in step S109 in FIG. 5.

FIG. 6 illustrates a rewrite processing routine shown in step S109 of FIG. 5.

In step S121, the switching unit 31 is turned ON to apply a high-voltage power supply output 23 to the FM 32 from the DC/DC converter 21. With the application of this voltage 23, the processing program stored in the FM 32 can be erased or rewritten.

Reversely speaking, the erasure or rewrite can not be performed in a state where no voltage 23 is applied. It is possible to only read the processing program stored therein in a state where only the voltage 22 is applied.

In step S122, the data communications with the rewrite device 50A is executed.

In step S123, the data from the rewrite device is decoded, thereby determining whether a write mode is indicated or not.

If the answer in step S123 is No, it is determined that an erase mode is indicated, and the operation proceeds to step S124, wherein the data in the FM 32 are erased.

In step S125, whether or not the erasure of the data within the FM 32 is completed is determined. If completed, the rewrite device 50A which will be described later is informed of this effect. Whereas if uncompleted, the erasure processing from step S124 is repeated.

In step S126, the data are received from the rewrite device 50A. In this case, the data transmitted are processing programs to be newly stored in the FM 32.

In step S127, the processing programs received are sequentially stored in the FM 32.

Determined in step S128 is whether or not the write processing is completed. If completed, the rewrite device which will be described later is informed of this effect. Whereas if uncompleted, the write processing from step S127 is repeated.

In step S129, the write processing is completed, and, therefore, the switching unit 31 is turned OFF.

Rewriting the processing programs to the FM 32 is ended with the above operation. The processing programs stored therein are not erased at all unless the high voltage 23 is applied to the switching unit 31.

In step S130, the present routine is intended to prevent a malfunction. Although the write mode is indicated, there is confirmed whether the erasure processing with respect to the FM 32 is completed or not. If the erasure is not yet processed, the erasure processing from step S124 is executed. Whereas if already completed, the operation shifts to step S126, wherein the write processing is carried out.

Figure 7:
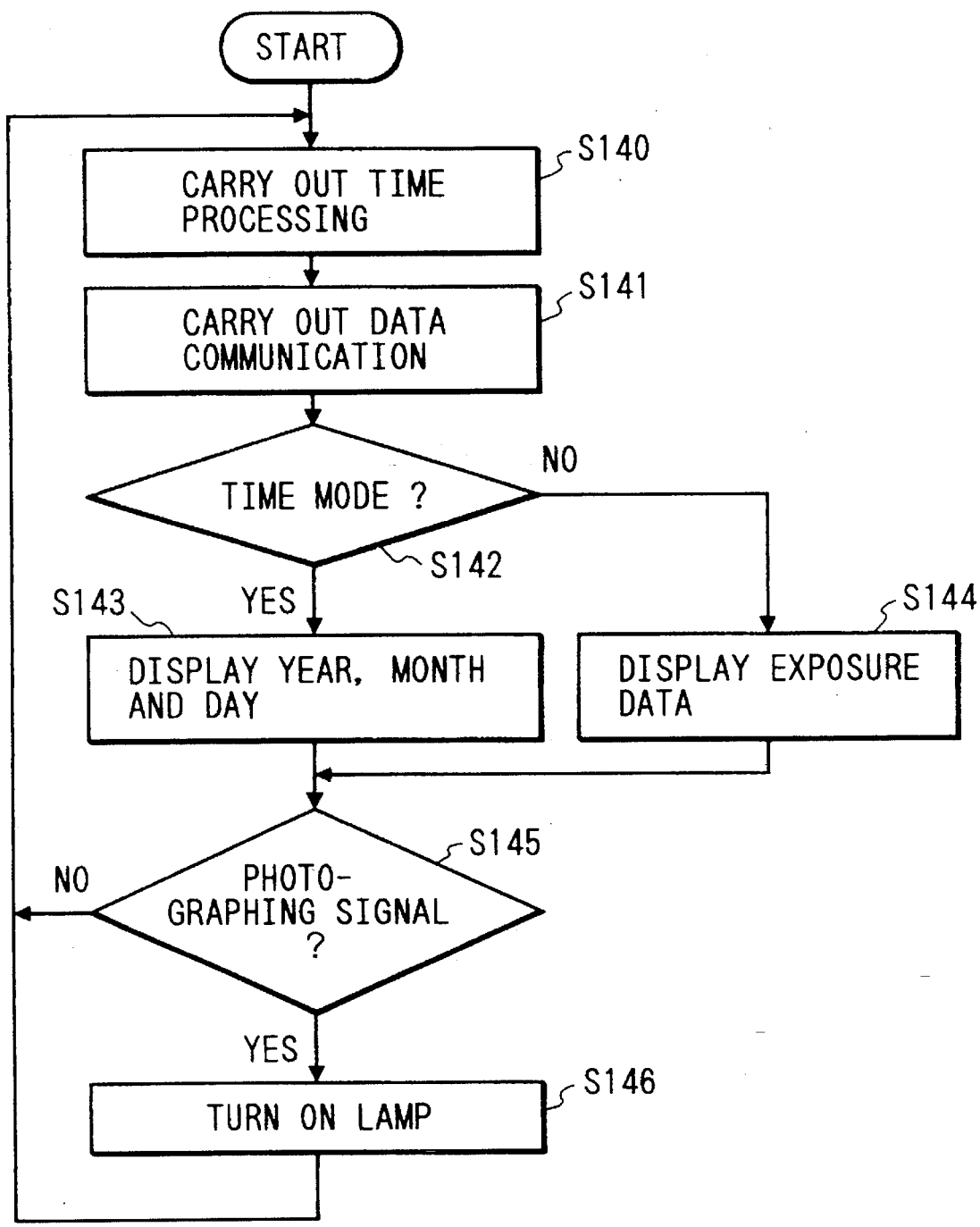
FIG. 7 is a flowchart showing a processing routine by the CPU in FIG. 3.

FIG. 7 shows an example of a processing routine in the databack 5 that is performed by the CPU 40. This routine is repeatedly executed for a duration of connection of the battery 41 to the CPU 40.

In step S140, there is executed timer processing based on the count of the output frequencies by the oscillator 45, i.e., the time processing with respect to year, month and date.

Note that the timer processing is carried out in only step S140 for simplifying the explanation in this embodiment, but there may be taken such a method as to execute the timer processing in parallel to the processes shown in step S141 and steps subsequent thereto.

In step S141, the data communications with the camera 1A are performed. At first, the camera 1A is informed of the effect that the communications with the databack 5 are conducted. Further, various items of exposure data are received as record data from the camera 1A. This step corresponds to step S101 in FIG. 6.

As described above, the data are transferred and received based on the known serial data communications via the terminals 15A to 15E. At this time, however, the operation does not yet enter an exposure sequence of the camera 1A, and hence the data-record signal via the terminal 15D is not inputted.

Determined in step S142 is whether a data record mode selected by the operation switch 46 is a time mode or not. In accordance with this embodiment, either the time mode indicating year, month and date or the exposure data mode is selectable.

If the answer in step S142 is Yes, i.e., in the case of the time mode, the operation shifts to step S143. Whereas if the answer is No, viz., in the case of the exposure data mode, the operation shifts to step S144. In step S143, the year/month/date data are displayed on the LCD 42. As explained above, the drive output of the CPU 40 is also applied in parallel to the data-record LCD 43, and, therefore, substantially the same contents are displayed on the LCDs 42, 43.

In step S144, as illustrated in FIG. 3, the exposure data are displayed on the LCD 42. The shutter time and the stop value are cited in the embodiment. However, the data are not confined to these values but may include the data directly associated with the exposure such as types of lenses in use or other data unrelated to the exposure such as a type of the camera 1A.

In step S145, whether or not the data-record signal is inputted from the camera 1A is determined by monitoring the terminal 15D. If the data-record signal is not inputted, the processes from step S140 are repeated.

In step S146, the data-record signal is inputted, and, hence, the lamp 44 is lit up for a fixed time, thereby optically recording, on the film, the data displayed on the LCD 43.

Figure 8:
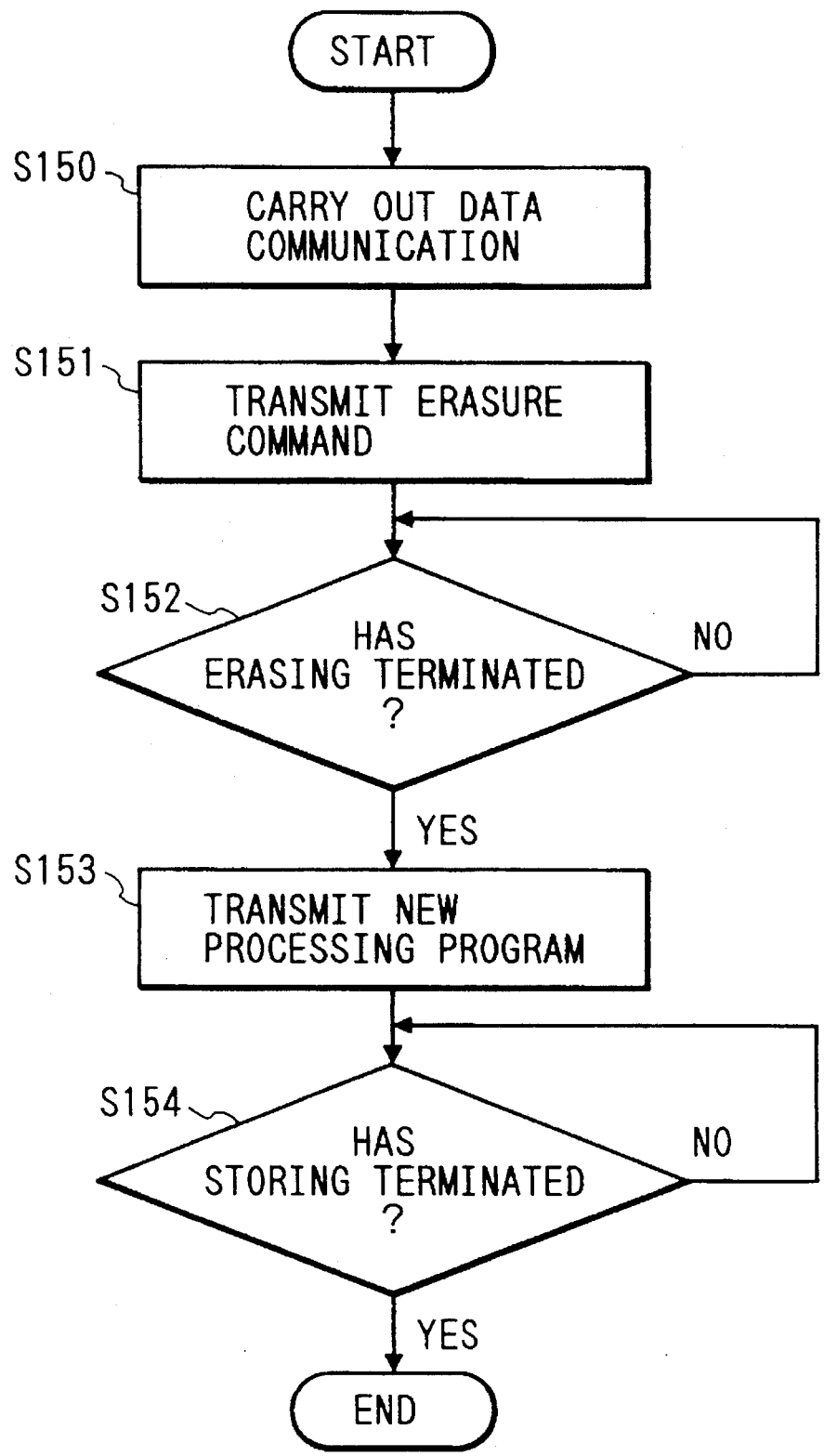
FIG. 8 is a flowchart showing a processing routine of the rewrite device illustrated in FIG. 4.

FIG. 8 shows a processing routine of the rewrite device 50A. As discussed above, the personal computer 52 executes the following processing in conformity with the commands stored on the FD 51 loaded therein.

In step S150, the data communications with the camera 1A are conducted. To begin with, the camera 1A is informed of the effect of being the rewrite device 50A itself. This step corresponds to step S101 in FIG. 5. However, unlike step S141 in FIG. 7, no record data is transmitted from the camera 1A.

As explained above, the data are transferred and received by known serial data communications via the terminals 16A to 16E. Unlike the databack 5, however, the terminal 16D is not employed because of being unrelated to the data record operation.

The camera 1A stops the fundamental processing with the present communications but enters step S109 in FIG. 5 to get ready for the rewriting to the FM 32, i.e., the rewrite processing explained in FIG. 6.

In step S151, a command to erase the processing program within the FM 32 is transmitted to the camera 1A. This corresponds to step S122 in FIG. 6.

In step S152, whether or not the processing program within the FM 32 is completely erased is determined. This corresponds to step S125 in FIG. 6.

In step S153, a new processing program to be stored in FM 32 is transmitted.

Determined in step S154 is whether or not all the processing programs have been stored in the FM 32. This corresponds to step S128 in FIG. 6. When completing both the erasure of the previous processing programs in the FM 32 and the storage of the new processing program into the FM 32, the present processing routine is finished.

Figure 9:
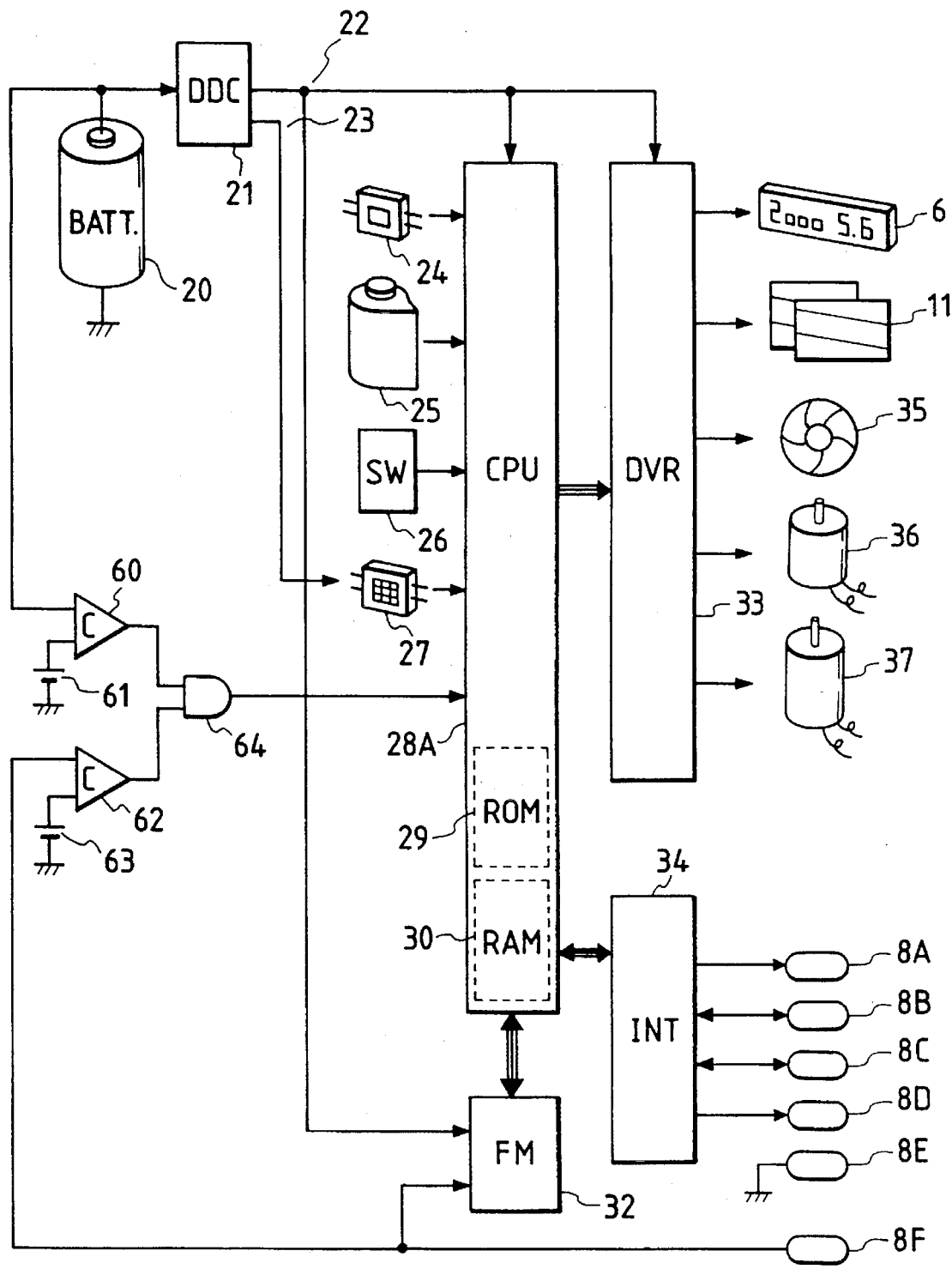
FIG. 9 is a block diagram illustrating an electric circuit in a second embodiment of the camera according to the present invention.

FIG. 9 shows an electric circuit in a second embodiment of the present invention. In the circuit illustrated in FIG. 9, comparators 60, 62, reference voltage sources and an AND gate 64 are employed in place of the switching unit 31 of the circuit shown in FIG. 2. At the same time, a terminal 8F is added thereto.

The following is a detailed explanation of the elements pertaining to the second embodiment of the present invention in FIG. 9.

A CPU 28A incorporates a read-only memory (ROM) 29, a read/write RAM 30, though not illustrated, a logical arithmetic unit and an AD converter and executes predetermined processing. Further, the CPU 28A receives the processing programs from the FM 32 via a plurality of lines and carries out control in accordance with the processing programs. This will be described with reference to a flowchart which will be given hereinbelow.

Herein, the ROM 29 is, as stated above, the read-only memory and stores only the processing programs needed for erasing and rewriting the data to the FM 32 through an interface circuit 34. Accordingly, the ROM 29 controls, when an erasing instruction with respect to the FM 32 is inputted via the interface circuit 34, an operation for performing this processing and also controls, when issuing an instruction to rewrite a new processing program after being erased, and operation for effecting this processing.

The CPU 28A is capable of executing the fundamental operation after such a processing program has been stored in FM 32.

The CPU 28A executes transferring and receiving of the following signals via the interface circuit 34. At first, a serial communications line is formed via terminals 8A to 8C. A clock signal is transmitted via the terminal 8A in one direction from the camera 1A. A handshake signal is transferred and received via the terminal 8B. Bidirectional transferring and receiving of a data signal are carried out via the terminal 8C. Note that there are known the configuration of the above-described serial communications line and the detailed data.

Further, a data-record signal is transmitted to the databack 5 (FIG. 1) via the terminal 8D. The data-record signal is generated corresponding to a timing at which the camera 1A starts the exposure operation. A data recording operation by the databack 5, which will be mentioned later, is executed with this data-record signal serving as a trigger. In this case, the terminal 8F is not used.

Also, as will be explained hereinafter, the terminals 8A to 8F are also connected to a program rewrite device 50B, (see FIG. 10) thus transferring and receiving a variety of signals.

In this instance, the processing programs within the FM 32 are erased and rewritten in accordance with operation signals of the rewrite device 50B. The program to be written is transmitted, as in the same way described above, along the serial communications line via the terminals 8A to 8C. Further, at this time, the terminal 8D for the data-record signal is not employed.

The terminal 8F is a power supply terminal through which an erasing/writing voltage is applied to the FM 32, and, only when executing the erasure and rewriting, a high voltage on the order of 12 V is applied from the rewrite device 50B. This eliminates a necessity for taking trouble to prepare a power source in the camera 1A, which is needed only when erased and rewritten to the FM 32. The rewrite device 50B is invariably required for erasing and rewriting and may be therefore equipped with the necessary power source.

Further, voltages of a battery 20 and the power supply terminal 8F are respectively applied to input terminals of comparators 60, 62 to which voltages of the reference voltage sources 61, 63 are imparted. Then, two outputs of the comparators 60, 62 are transferred to the AND gate 64, and an output of the AND gate 64 is connected to the CPU 28A.

With this arrangement, if either the battery voltage 20 or the voltage of the power supply terminal 8F is smaller than a predetermined voltage, the CPU 28A is notified of this effect by means of an output of the AND gate 64. Therefore, as will be described hereinbelow, the CPU 28A does not execute the erasing/rewriting operations with respect to the FM 32. In the case of the battery 20 being consumed, or in the case of the voltage of the power supply terminal 8F being low for some reason, if erased and rewritten to the FM 32, there exists a possibility such that the complete erasure is not done or the processing program is rewritten in an incorrect status.

Figure 10:
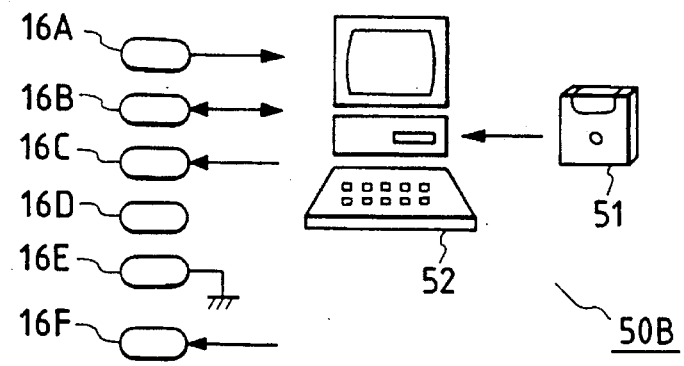
FIG. 10 is a conceptual diagram illustrating a program rewrite device in a third embodiment as well as in the second embodiment of the camera according this invention.

FIG. 10 is a conceptual diagram illustrating the program rewrite device 50B for erasing and rewriting the processing program to the FM 32 within the camera 1A in accordance with the second embodiment of the present invention.

As in the same way with the rewrite device 50A shown in FIG. 4, a processing sequence of the rewriting operation and the processing program to be written to the FM 32 are stored on the floppy disc (hereinafter abbreviated to FD) 51, wherein the central device is a personal computer 52. As well known, the personal computer 52 executes the operation thereof in accordance with the data on the FD 51.

The rewrite device 50B has terminals 16A to 16F, thereby transmitting and receiving the rewrite command and the processing program in contact with the string-of-terminal 8 of the camera 1A. Note that the rewrite device 50B is unrelated to the data record operation, and, therefore, the terminal 16D has no function.

When rewriting the processing program of the FM 32 within the camera 1A, the personal computer 52 is connected via the terminals 16A to 16F to the camera 1A, and the personal computer 52 may be operated based on the FD 51. As will be stated later, a voltage of approximately 12 V is at first applied to the terminal 16F, thereby operating the FM 32 within the camera 1A. Thereafter, necessary data are transmitted by the serial communications through the terminals 16A to 16C.

Figure 11:
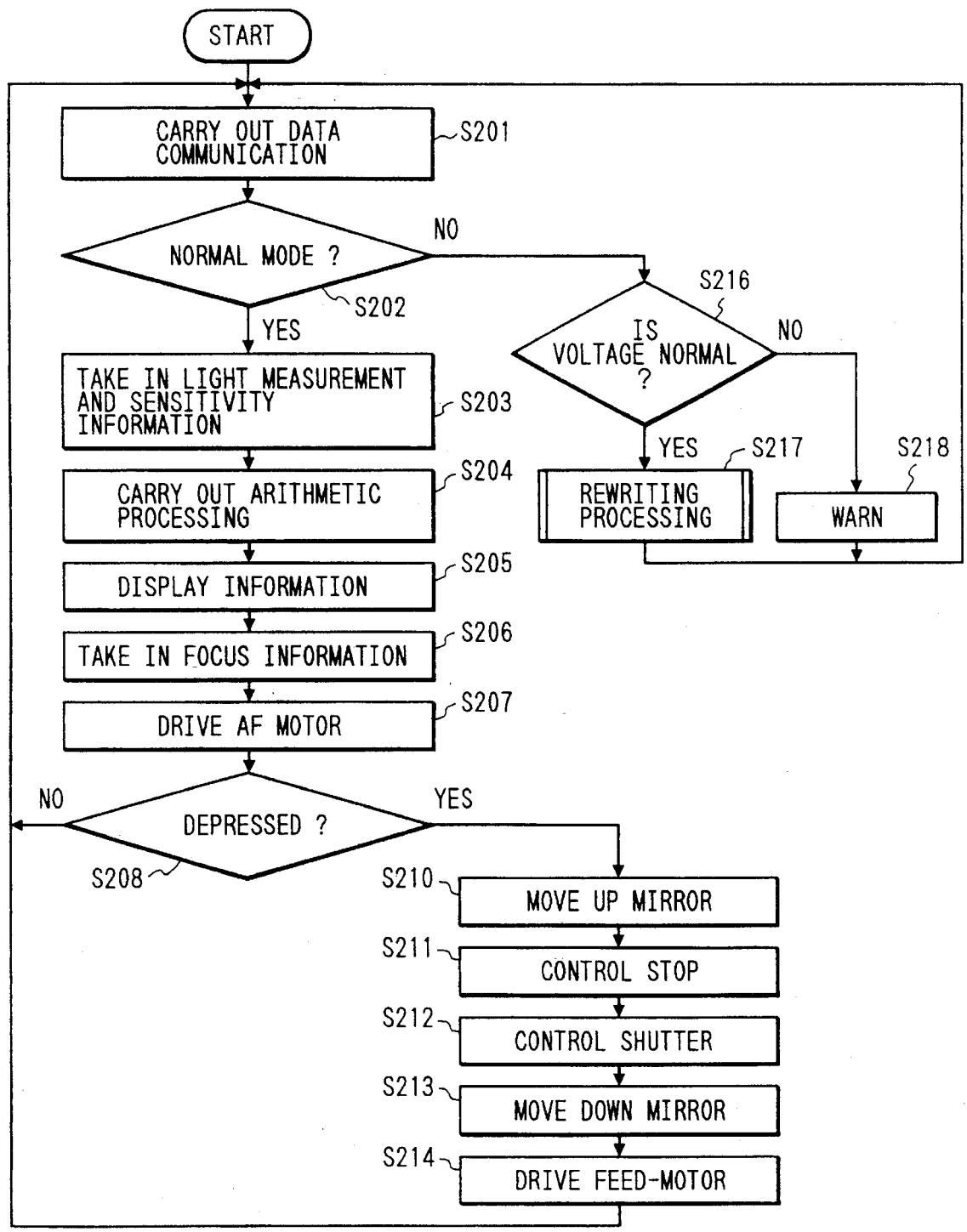
FIG. 11 is a flowchart showing a processing routine by the CPU in FIG. 9.

FIG. 11 shows a processing routine by the CPU 28A of FIG. 9.

This routine is repeatedly executed for a duration of a power supply.

In step S201, the data communications are carried out via the terminals 8A to 8F. The data communications are established even when either the databack 5 or the rewrite device 50B is mounted, but the data received by the CPU 28A contains an item of identification data of a transmission side.

Determined based on the received data in step S202 is whether in the normal mode or not, i.e., whether the databack 5 or the rewrite device 50B is mounted. If the answer is Yes, viz., if the identification data indicates the databack 5, the operation shifts to the normal processing in step S203 and steps subsequent thereto. Whereas if the answer is No, i.e., when the identification data indicates the rewrite device 50B, the operation jumps to step S216.

In step S216, whether the voltages of the battery 20 and the terminal 8F are normal or not is determined based on the output of the AND gate 64.

In step S217, if the answer in step S216 is Yes, i.e., when the output of the AND gate 64 is normal, the erasure and the rewriting to the FM 32 are executed in this routine. This will be described in detail with reference to FIG. 12.

In step S218, if the answer in step S216 is No, viz., when the output of the AND gate 64 is abnormal, i.e., when determining that both or one of the voltages of the battery 20 and the terminal 8F is smaller than the predetermined voltage, warning is executed. This may be done by flashing a warning mark on the LCD 6 of the camera 1 or on the screen of the personal computer 52.

Steps S203 to S208 and S210 to S214 are the same as steps S103 to S108 and S110 to S114 in FIG. 5, and hence their repetitive explanations will be omitted.

Figure 12:
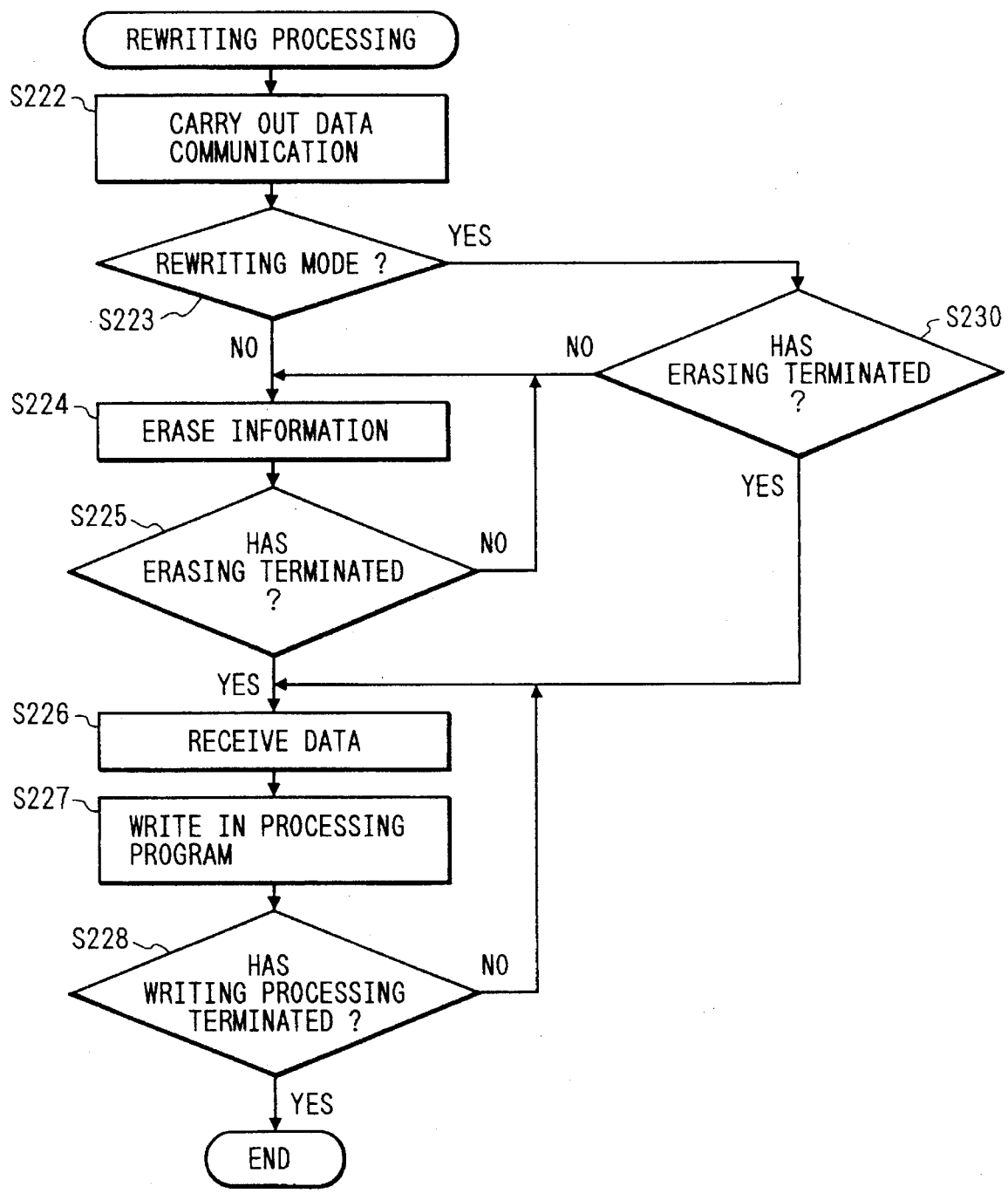
FIG. 12 is a flowchart showing a processing routine in step S217 in FIG. 11.

FIG. 12 shows a rewrite processing routine shown in step S217 in FIG. 11.

This processing routine conforms with an unrewritable program stored in the ROM 29 within the CPU 28A. Further, the processing programs received via the terminals 8A to 8F and the interface circuit 34 are temporarily stored in the RAM 30 within the CPU 28A. Thereafter, these processing programs are transferred and stored in the FM 32. Note that step S222 to S228 and S230 are the same as S122 to S128 and S130 in FIG. 6, and their repetitive explanations are therefore omitted.

Figure 13:
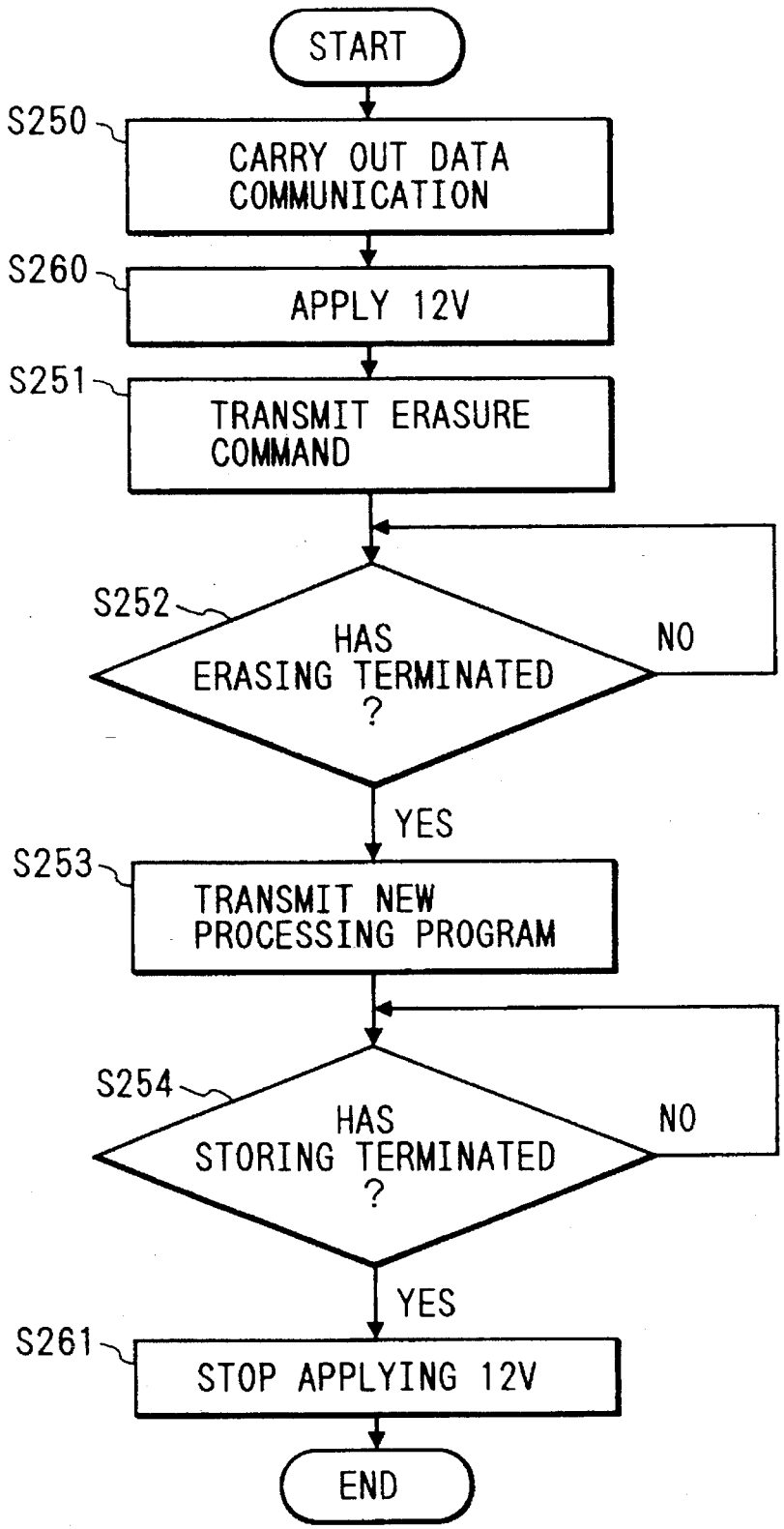
FIG. 13 is a flowchart showing a processing routine of the rewrite device shown in FIG. 10.

FIG. 13 shows a processing routine of the rewrite device 50B. As discussed above, the personal computer 52 executes the following processing in conformity with the commands stored on the FD 51 loaded therein.

In step S250, the data communications with the camera 1A are conducted. To begin with, the camera 1A is informed of the effect of being the rewrite device 50B itself. This step corresponds to step S201 in FIG. 11. However, unlike step S141 in FIG. 7, no record data is transmitted from the camera 1A.

As explained above, the data are transferred and received by the known serial data communications via the terminals 16A to 16F. Unlike the databack 5, however, the terminal 16D is not employed because of being unrelated to the data record operation.

The camera 1A stops the fundamental processing with the present communications but enters step S216 and steps subsequent thereto in FIG. 11 to get ready for the rewriting to the FM 32, i.e., the rewrite processing explained in FIG. 12.

In step S260, an erasing/rewriting voltage of approximately 12 V is outputted to the FM 32 of the camera 1A through the terminal 16F.

In step S251, next, a command to erase the processing programs in the FM 32 is transmitted to the camera 1A. This corresponds to step S224 in FIG. 12.

In step S252, there is determined whether or not the erasure of the processing programs in the FM 32 is completed. This corresponds to step S225 in FIG. 12.

Transmitted in step S253 is a new processing program to be stored in the FM 32.

Determined in step S254 is whether or not the storage of all the processing programs into the FM 32 is finished. This corresponds to step S228 in FIG. 12. When completing the erasure of the previous processing programs within the FM 32 and the storage of the new processing program thereinto, the present processing routine comes to an end.

In step S261, the erasing/rewriting processing to the FM 32 is completed, and, hence, there is stopped the supply of the voltage of 12 V via the terminal 16F.

FIG. 9 illustrates an electric circuit using a CPU 28B structured to incorporate three types of memories, i.e., the ROM 29, the RAM 30 and the FM 32 in a third embodiment of the present invention.

A different point from the second embodiment is that high-pressure side output 23 of the DC/DC converter 21 is at first applied to the FM 32 through the switching unit 31, and further, the switching unit 31 is ON/OFF-controlled by a signal transmitted from the rewrite device 50B via the terminal 8F.

Based on this construction, the rewrite device 50B is connected to the camera 1A, and, besides, the voltage 23 is applied to the FM 32 only when executing the erasing/rewriting operation to the FM 32. It is therefore possible to prevent the possibility of erasing the processing programs within the FM 32 due to a mis-supply of the voltage 23 in other times.

Figure 14:
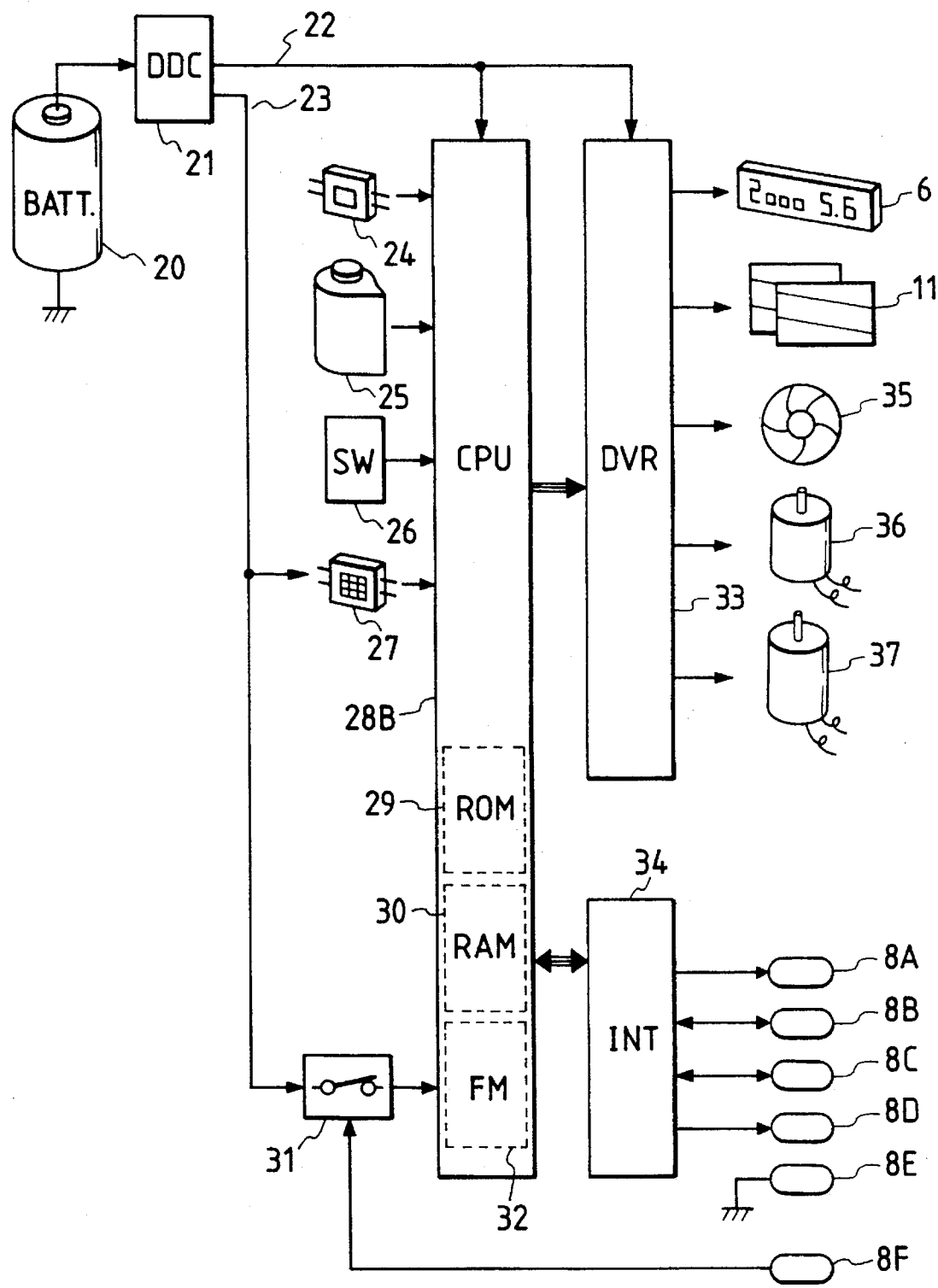
FIG. 14 is a block diagram illustrating an electric circuit in the third embodiment of the camera according to the present invention.

The following is a more characteristic point of the circuit illustrated in FIG. 14. The camera 1A is constructed to conform with erasable/rewritable processing programs as some of the processing programs exhibiting a high possibility to be changed afterward within the FM 32 with respect to a photometric arithmetic routine and a display processing routine but conform with fixed processing programs stored in the ROM 29 with respect to an erasing/rewriting routine itself to the FM 32 and remaining processing programs exhibiting a small possibility to be changed afterward when removing the above photometric arithmetic routine and the display processing routine from the processing programs needed for the camera 1A in this embodiment.

Figure 15:
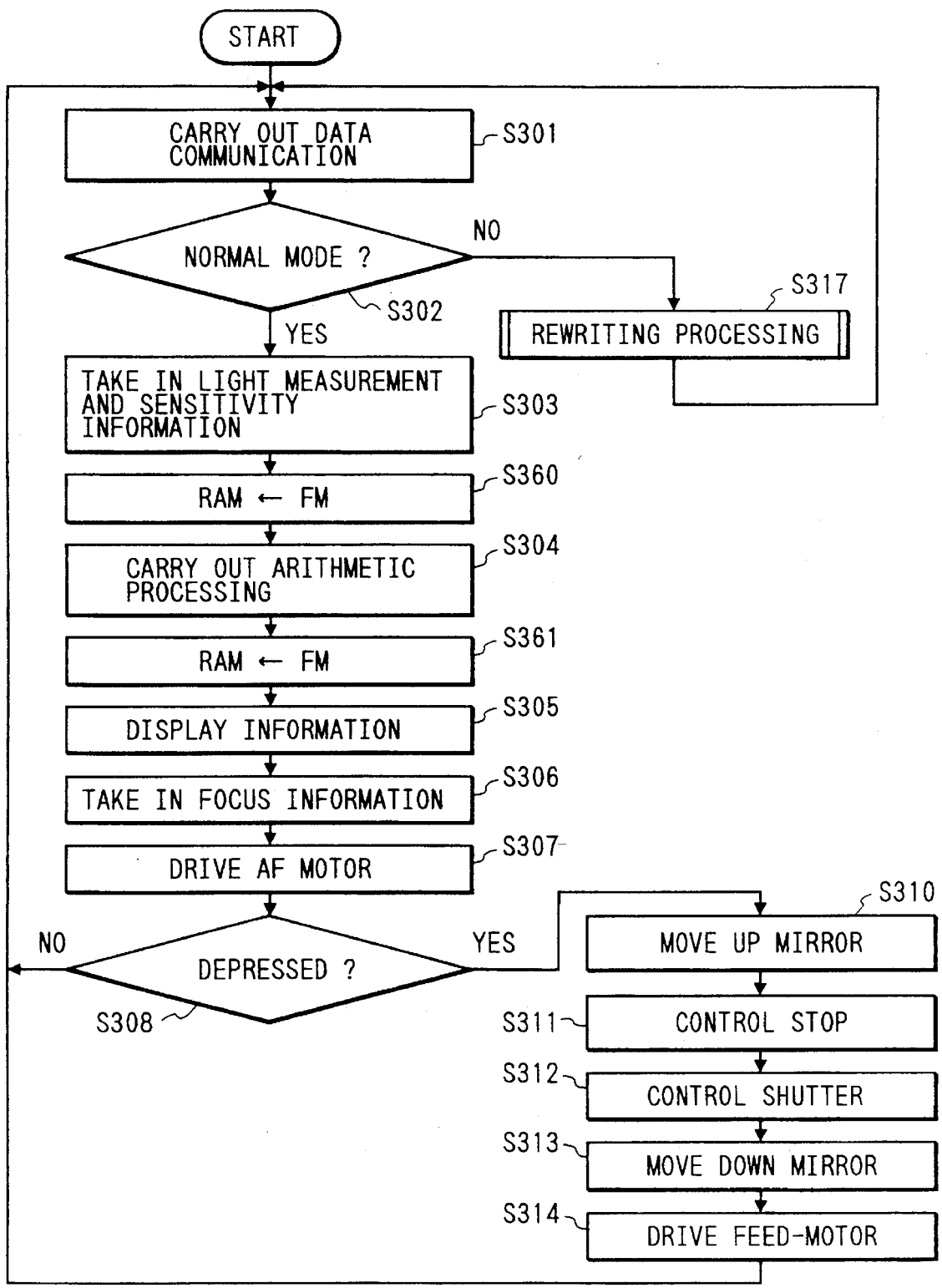
FIG. 15 is a flowchart showing a processing routine by the CPU in FIG. 14.

FIG. 15 shows a processing routine by the CPU 28B of FIG. 14.

This routine is repeatedly executed for a duration of a power supply.

In step S301, the data communications are carried out via the terminals 8A to 8F. The data communications are established even when either the databack 5 or the rewrite device 50B is mounted, but the data received by the CPU 28B contains an item of identification data of a transmission side.

Determined based on the received data in step S302 is whether in a normal mode or not, i.e., whether the databack 5 or the rewrite device 50B is mounted. If the answer is Yes, viz., when the identification data indicates the databack 5, the operation shifts to the normal processing in step S303 and steps subsequent thereto. When the identification data indicates the rewrite device 50B, the operation jumps to step S317.

In step S317, when the rewrite device 50B is connected, the erasure and the rewriting to the FM 32 are carried out in this routine. The details thereof are the same as those shown in FIG. 12.

In step S303, the photometric data and the sensitivity data are taken in from the light metering unit 24 and the sensitivity detection unit In step S360, an arithmetic processing program stored in the FM 32 is read and temporarily stored in the RAM 30.

In step S304, two items of data obtained in step S303 are subjected to the arithmetic processing in accordance with the processing program obtained in step S360, thus calculating a shutter time and a stop value that are defined as proper exposure conditions.

In step S361, a display processing program stored in the FM 32 is read and temporarily stored in the RAM 30.

In step S305, the exposure data or the mode data obtained in step S304 is displayed on the LCD 6 in accordance with the processing program obtained in step S361.

Steps S306 to S308 and S310 to S314 are the same as steps S106 to S108 and S110 to S114 in FIG. 5, and their repetitive explanations are therefore omitted.

Incidentally, in FIG. 15, there has been explained such that the processing programs stored in the FM 32 are temporarily read to the RAM 30 to execute the necessary processing as in steps S360 and S361. If the arithmetic processing can be performed directly in accordance with the contents of the FM 32, however, such an execution is not required. This contributes savings in time.

According to the processing given above, the camera 1A does not require the large capacity FM 32 because of the ROM 29 being capable of storing only the basic processing routines exhibiting the small possibility to be changed. Besides, it is feasible to make the CPU 28 inexpensive and attain down-sizing thereof.

In this Figure, only the photometric arithmetic routine and the display processing routine are processed in accordance with the processing programs stored in the FM 32. The processing is not, however, limited to this but may be readily adjusted. The focus detection arithmetic processing in step S306, the AF motor drive processing in step S307 and a feed motor drive processing in step S314 other than the above-mentioned may be given as candidates for examples of the routines that would be better to be stored in the FM 32.

On the other hand, the configuration of the rewrite device 50B is the same as that shown in FIG. 10. A different point is, however, such that the terminal 16F is related not to the supply the voltage of 12 V but to a mere signal needed for turning ON/OFF the switching unit 31. Further, there are only the following two modified points of the steps in FIG. 13 relative to the construction in FIG. 14.

In step S260, a close signal is outputted to the terminal 16F, thereby turning ON the switching unit 31 in the camera 1A.

In step S261, an open signal is outputted to the terminal 16F, thereby turning OFF the switching unit 31 in the camera 1A.

Figure 16:
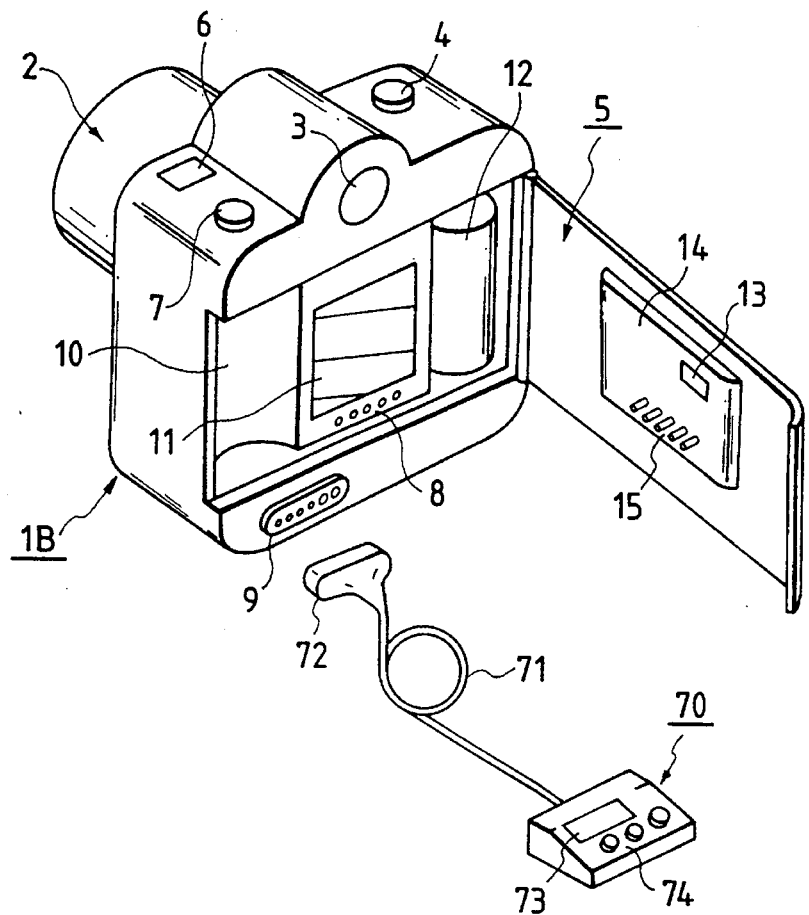
FIG. 16 is a perspective view illustrating another camera according to the present invention and a remote control used together therewith.

FIG. 16 illustrates another camera 1B according to the present invention and a remote control 70. This camera 1B is much the same as the camera 1A illustrated in FIG. 1 except an arrangement such that a string-of-terminal 9 for connecting the remote control 70 is provided on the left side of a lower portion of a rear surface thereof.

The camera is remote-controlled by the remote control 70 via a cable 71. The remote control 70 is employed by connecting a string-of-terminal 72 provided at the tip of the cable 71 to a string-of-terminal 9 of the camera 1B. The remote control 70 is equipped with an LCD 73 and a plurality of operation buttons 74. The photographer can operate the camera 1B by manipulating the operation buttons 74 while confirming a photographing mode and photographing conditions displayed on the LCD 73.

Figure 17:
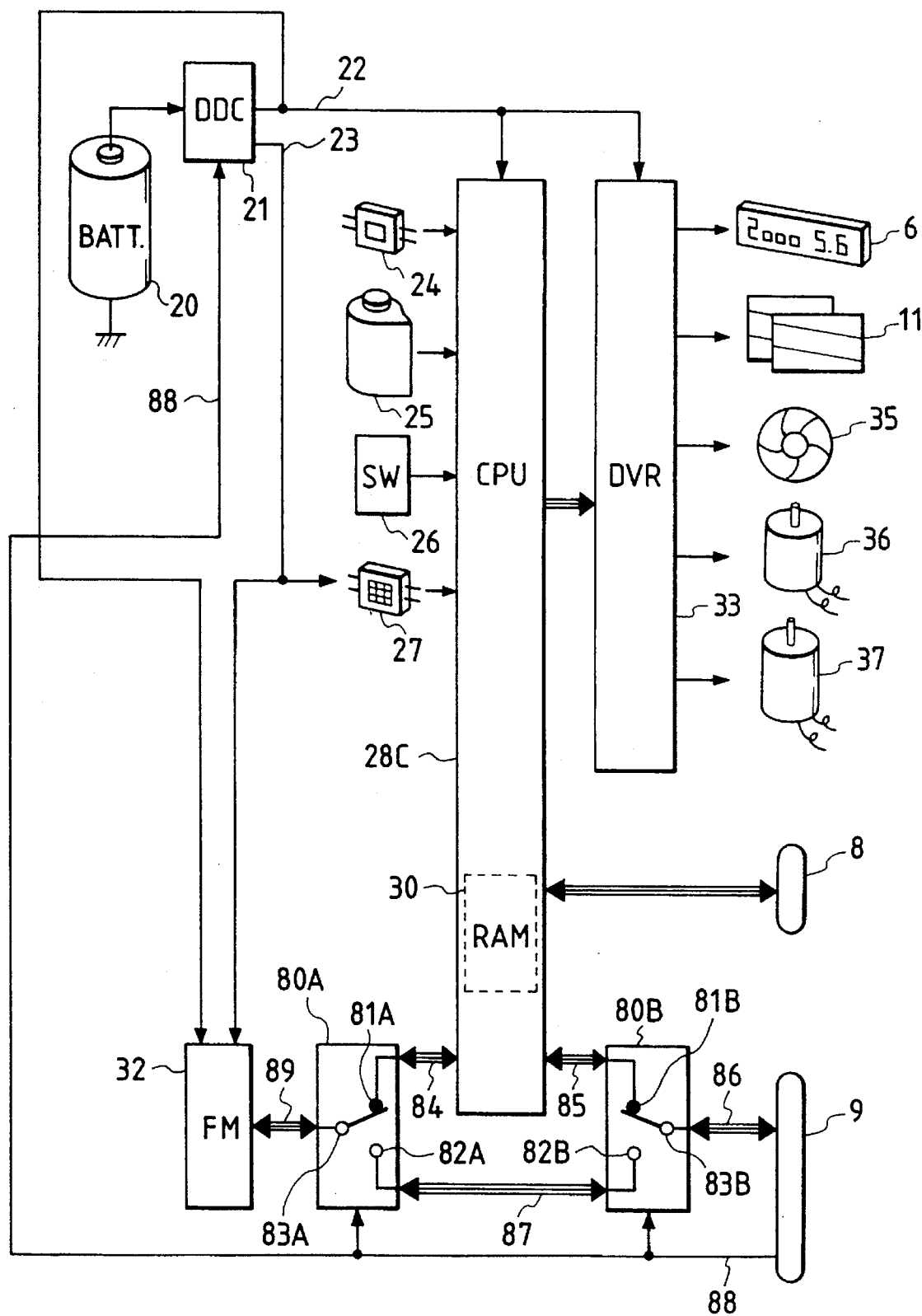
FIG. 17 is a block diagram illustrating an electric circuit in a fourth embodiment of the camera according to the present invention.

FIG. 17 illustrates an electric circuit in a fourth embodiment of the present invention. This circuit is applied to the camera 1B shown in FIG. 16 and comprises the DC/DC converter 21, the light metering unit 24, the film sensitivity detection unit 25, the switch detection unit 26, the focus detection unit 27, a CPU 28C, a driver 33, the LCD 6, the shutter 11, the stop 35, the motors 37, the string-of-terminal 8, the string-of-terminal 9, the flash memory (FM) 32 and changeover switches 80A, 80B.

The DC/DC converter 21 converts a voltage generated by the battery 20 into a predetermined voltage and thereafter supplies the voltage to the respective elements. The DC/DC converter 21 in this embodiment has two systems, viz., a voltage output 22 and a voltage output 23. The voltage output 22 is employed for driving respective control circuits including the CPU 28C and the FM 32. A voltage of the voltage output 22 is 5 V. The voltage output 23 is used for driving the focus detecting unit 27 and the FM 32 and has a voltage on the order of 12 V in this embodiment. The DC/DC converter 21 is constructed, even when the CPU 28C does not operate, to ON/OFF-control the voltage output 23 in accordance with a changeover signal appearing on a signal line 88 which will be mentioned later.

The string-of-terminal 9 is, as stated earlier, a string of terminals for connecting the remote control 70. Further, the string-of-terminal 9 also serves as terminals for writing the data to the FM 32. The string-of-terminal 9 itself includes six pieces of terminals. The number of terminals is not, however, confined to 6.

The FM 32 stores the programs used by the CPU 28C. This embodiment is characterized most by providing the FM 32 and a peripheral circuit of the FM 32. Accordingly, these characteristic points will be hereinafter explained in greater detail.

The CPU 28C controls and supervises the whole camera. The CPU 28C in this embodiment entails adopting a so-called one-chip type microprocessor including the RAM 30, a logical arithmetic unit and an AD converter. The CPU 28C executes predetermined arithmetic processing by use of programs (and data) stored beforehand in the FM 32, thereby controlling the LCD 6, the shutter 11, the stop 35 and the motors 36, 37. Note that the actual control is conducted through the driver. In addition to this, the CPU 28C incorporates a function to transfer and receive the data with respect to the databack 5 via the string-of-terminal 8.

There will be explained in detail the most characteristic points in this embodiment, i.e., the FM 32 and a configuration of the peripheral circuit thereof.

As already stated, the FM 32 stores the programs used by the CPU 28C. The flash memory has a large capacity and is therefore capable of sufficiently storing a large quantity of programs required by the CPU 28C. Further, the flash memory allows easy changing of the programs because of being electrically rewritable. The flash memory also has an advantage in which a time needed for rewriting the program is short because of being batch-erasable or erasable on the block unit (erasure by several bytes or several tens of bytes). Although there exist various types of memories such as a NAND type memory, a NOR type memory, etc. as a flush memory, any type of memory is applicable.

The FM 32 receives a supply of the voltage from both of the voltage output 22 and the voltage output 23. The electric power from the voltage output 22 is supplied to the FM 32 only when reading the stored programs. On the other hand, the electric power from the voltage output 23 serves to bring the FM 32 into a rewritable status when rewriting those programs. Note that the voltage output 23 used in common to the focus detection unit 27 is employed in this embodiment, but the DC/DC converter 21 may be provided with a voltage output dedicated to the FM 32. Alternatively, the electric power necessary for the rewriting process may be supplied from outside by diverting the change-over signal of the signal line 88. The programs stored in the FM 32 are held without being erased even if the FM 32 is supplied with neither the voltage 22 nor the voltage 23.

The FM 32, the CPU 28C and the string-of-terminal 9 are so constructed as to be connectable to each other through changeover switches 80A, 80B.

In accordance with this embodiment, the changeover switches 80A, 80B are actualized by use of bidirectional switching elements composed of a plurality of semiconductor switches. The changeover switch 80A includes three contact points 81A, 82A, 83A. The changeover switch 80A is constructed to alternatively connect only one of the contact points 81A, 82A to the contact point 83A by changing over the internal circuit in accordance with a command (herein, a signal inputted via the signal line 88) from outside. The changeover switch 80B is also constructed fundamentally the same. The changeover switch 80B is so constructed as to alternatively make only one of the contact points 81B, 82B connectable to the contact point 83B.

The CPU 28C is connected via a signal line 84 to the contact point 81A of the changeover switch 80A. The FM 32 is also connected via a signal line 89 to the contact point 83A. On the other hand, the CPU 28C is connected via a signal line 85 to the contact point 81B of the changeover switch 80B. The string-of-terminal 9 is connected via a signal line 86 to the contact point 83B. Further, the contact point 82A is connected via a signal line 87 to the contact point 82B. As a result of taking such a construction, the FM 32 and the CPU 28C can be electrically connected to each other by connecting the contact point 81A to the contact point 83A of the changeover switch 80A. The string-of-terminal 9 and the CPU 28C are electrically connectable to each other by connecting the contact point 83B to the contract point 81B of the changeover switch 80B. Furthermore, the string-of-terminal 9 is connected to the FM 32 by connecting the contact points 82B, 83B to each other as well as connecting the contact points 83A, 82A to each other. At the same time, the CPU 28C is so constructed as to be electrically disconnectable from the FM 32 and the string-of-terminal 9 as well.

Then, the internal circuit of these changeover switches 80A, 80B is so constructed as to be switched over in accordance with a signal inputted from the string-of-terminal 9 via the signal line 88. Each of the signal lines 84, 86, 87, 89 consists of five signal line elements. The signal line consists of four signal line elements. The signal line 85 is composed of a single signal line element. A specific configuration is not, however, limited to the above-mentioned. When a changeover indication is sent in the form of a command, it is possible to use only one signal line by making other signal lines 86, etc. serve as the signal line 88 in principle.

Figure 18:
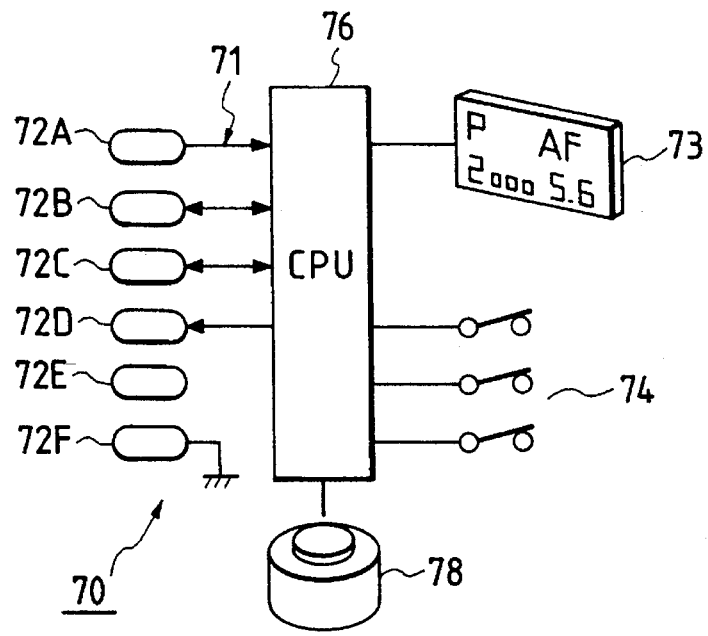
FIG. 18 is a block diagram illustrating an electric circuit of the remote control shown in FIG. 16.

The details of the electric circuit within the remote control 70 will be described with reference to FIG. 18.

The remote control 70 comprises an LCD 73, a plurality of operation buttons 74, a CPU 76, a string-of-terminal 72 (terminals 72A to 72F).

The operation buttons 74 are buttons by which the photographer inputs setting indications of the photographing mode, the focus detection mode and a variety of conditions such as the exposure condition. Further, the operation button serves to switch ON the power supply and indicate a release operation. The conditions set by use of the operation button 74 are displayed on the LCD 73.

A series of these operations are realized by the CPU 76 controlling the LCD 73 and performing the communications with the camera 1B in response to an input from the operation button 74. Note that a battery 78 supplies the electric power needed for operating the respective elements.

Terminals 72A to 72D serve to connect the remote control 70 to the camera 1B. A string-of-terminal 72 is connected to the string-of-terminal 9 of the camera 1B. A variety of setting conditions and commands are transferred and received through the cable 71 and the string-of-terminals 72, and 9. The following are signals of which the respective terminals take charge.

The clock signal is received through the terminal 72A from the camera 1B. Executed are transferring and receiving the handshake signal through the terminal 72B and a variety of data signals through the terminal 72C in two ways. Multiplexed power-ON signal and release signal are directly transferred and received through the terminal 72D.

Note that the terminal 72E is used for the changeover signal employed when rewritten to the FM 32, and, therefore, the remote control 70 is not employed. The terminal 72F is grounded.

Figure 19:
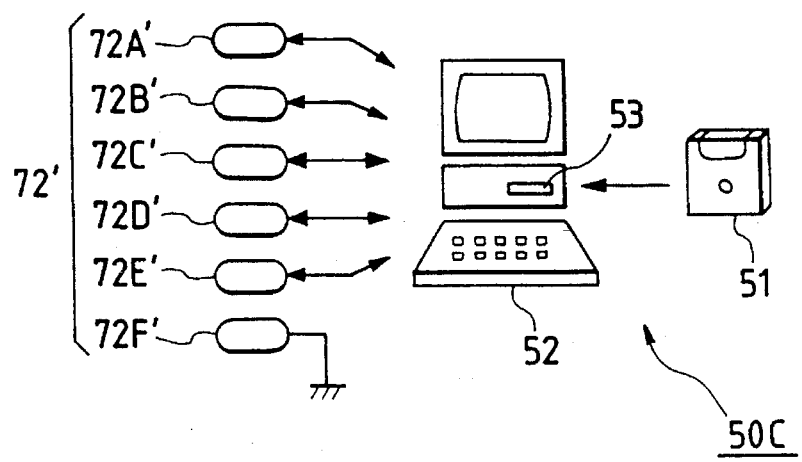
FIG. 19 is a conceptual diagram illustrating a program rewrite device in the fourth embodiment of the camera according to this invention.

Next, there will be explained a program rewrite device 50C for erasing/rewriting the programs within the FM 32 in accordance with a fourth embodiment of the present invention with reference to FIG. 19.

The program rewrite device 50C can be constructed mainly of a personal computer 52 including an external storage unit 53 and an external output string-of-terminal 72' (terminals 72A' to 72F'). Note that the floppy disc (FD) 51 previously stores a program for prescribing a processing sequence of the rewriting operation and a new control program to be written to the FM 32. In comparison with the circuit diagram of FIG. 17, the terminals 72A' to 72D' are connected to the signal line 86, and the terminal 72E' is connected to the signal line 88.

Given next is an explanation of the operation within the camera 1B when normally used and when rewriting the program within the FM 32.

In the normal using state, nothing is connected to the string-of-terminal 9, or the string-of-terminal 72 is connected to the remote control 70. In this state, since no changeover signal exists on the signal line 88, the changeover switch 80A connects the CPU 28C to the FM 32. Accordingly, the CPU 28C is capable of reading the programs and the data from the FM 32. On the other hand, the changeover switch 80B connects the signal line 86 of the string-of-terminal 9 to the CPU 28C. Hence, the photographer can remote-control the camera 1B by use of the remote control 70. The contact points 82A, 82B and the signal line 87 for connecting these two contact points 82A, 82B to each other are brought into an isolated status from all of the FM 32, the CPU 28C and the string-of-terminal 9. For this reason, there is no possibility in which electric potentials of the relevant portions will cause a malfunction.

When the rewrite device 50C is connected to the string-of-terminal 9, the changeover signal appears on the signal line 88. Hereupon, the DC/DC converter 21 starts supplying the electric power required when rewriting the program to the FM 32. The FM 32 is thereby brought into a content-rewritable status. Further, the changeover switches 80A, 80B are changed over to connect the FM 32 to the signal line 86. Accordingly, the FM 32 stores a new program transmitted by the rewrite device 50C via the string-of-terminal 9 and the signals lines 86, 87, 89.

As a matter of course, in this state, the CPU 28C is isolated from the FM 32 and the string-of-terminal 9 as well. For this reason, the rewrite processing to the FM 32 undergoes no influence by an operating status of the CPU 28C at all. Reversely, the program rewrite signal does not exert an adverse influence on the CPU 28C.

Figure 20:
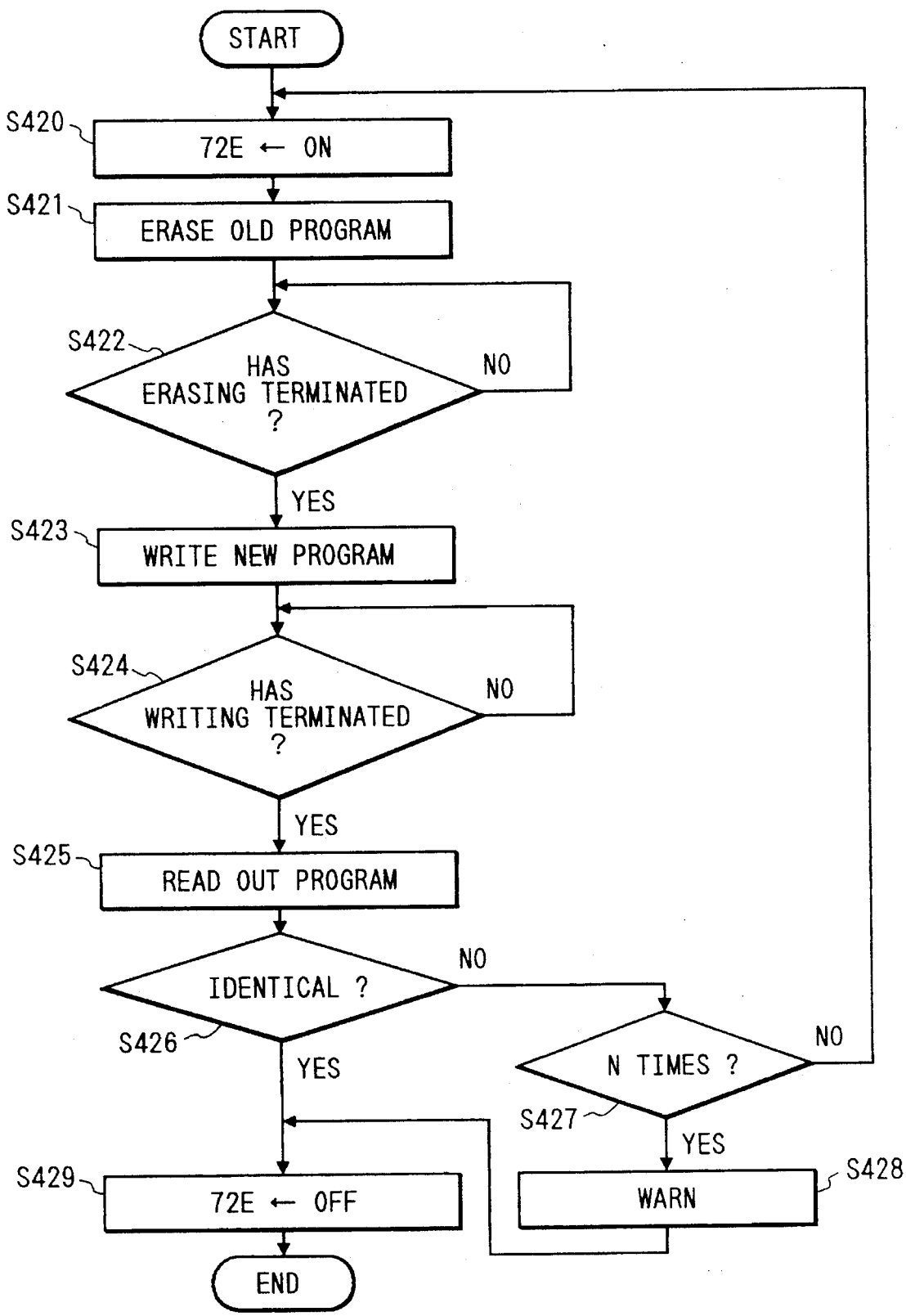
FIG. 20 is a flowchart showing a processing routine of the rewrite device shown in FIG. 19.

Next, the operation of the rewrite device 50C will be described with reference to a flowchart of FIG. 20 showing a processing routine thereof.

The user, at first, connects the string-of-terminal 72' to the string-of-terminal 9, thus connecting the rewrite device 50C to the camera 1B. Thereafter, the user causes the personal computer 52 to execute the program stored on the FD 51. A rewrite command and the processing program are sent to the camera 1B from the external output terminals 72A' to 72E', thereby performing the following processing.

The rewrite device 50C outputs the changeover signal via the terminal 72E' (step S420). The changeover signal is transmitted via the signal line 88 to the DC/DC converter 21 which is in turn started. Further, simultaneously with this processing, the changeover switches 80A, 80B are changed over, thereby disconnecting the FM 32 and the CPU 28C from each other. Also, the FM 32 is connected directly to the rewrite device 50C through the string-of-terminals 9, 72'.

The rewrite device 50C indicates the FM 32 to erase the previous processing program within the FM 32 (step S421). The rewrite device 50C is kept in a standby status till the FM 32 completes the erasing operation in accordance with the above indication (step S422). Incidentally, in this embodiment, after the standby status has continued for a predetermined time enough to surely effect the erasure without confirming whether or not the erasing operation is actually completed, the operation automatically proceeds to next processing.

The rewrite device 50C reads a new program from the FD 51 and starts processing to output this program from the terminals 72A' to 72D' (step S423). Then, the rewrite device 50C is held in the standby status till a transfer of the program is finished (step S424). Note that the relevant program is transferred to the FM 32 via the cable 71, the string-of-terminal 72', the terminal-of-string 9 and the signal lines 86, 87, 89.

When finishing the transfer of the program, the new processing program stored in the FM 32 at that time is reread this time (step S425). Then, there is determined whether or not the read program coincides with the original program within the FD 51 (step S426). If coincident with each other, it is determined that the program is correctly written, and the rewrite device 50C finishes the processing by setting the changeover signal outputted to the terminal 72E' in an OFF status (step S429). Hereupon, the changeover switches 80A, 80B operate, whereby the rewrite device 50C is disconnected from the FM 32. The FM 32 is again connected to the CPU 28C.

In step S426, whereas if not coincident with each other, the rewrite device 50C confirms the number of the erasing/rewriting processes performed. Determined is whether or not this reaches a predetermined limit number of times (herein, N times) (step S427). If this does not reach the limit number of times (N times), the operation goes back to step S420, wherein the processing is again performed. Whereas if this reaches the limit number of times, the user is notified of the fact that the correct program could not be written by issuing a warning on the rewrite device 50C (step S428). Thereafter, the operation proceeds to step S429 to finish the processing. Note that the limit number of times is set to 3 in this embodiment.

Figure 21:
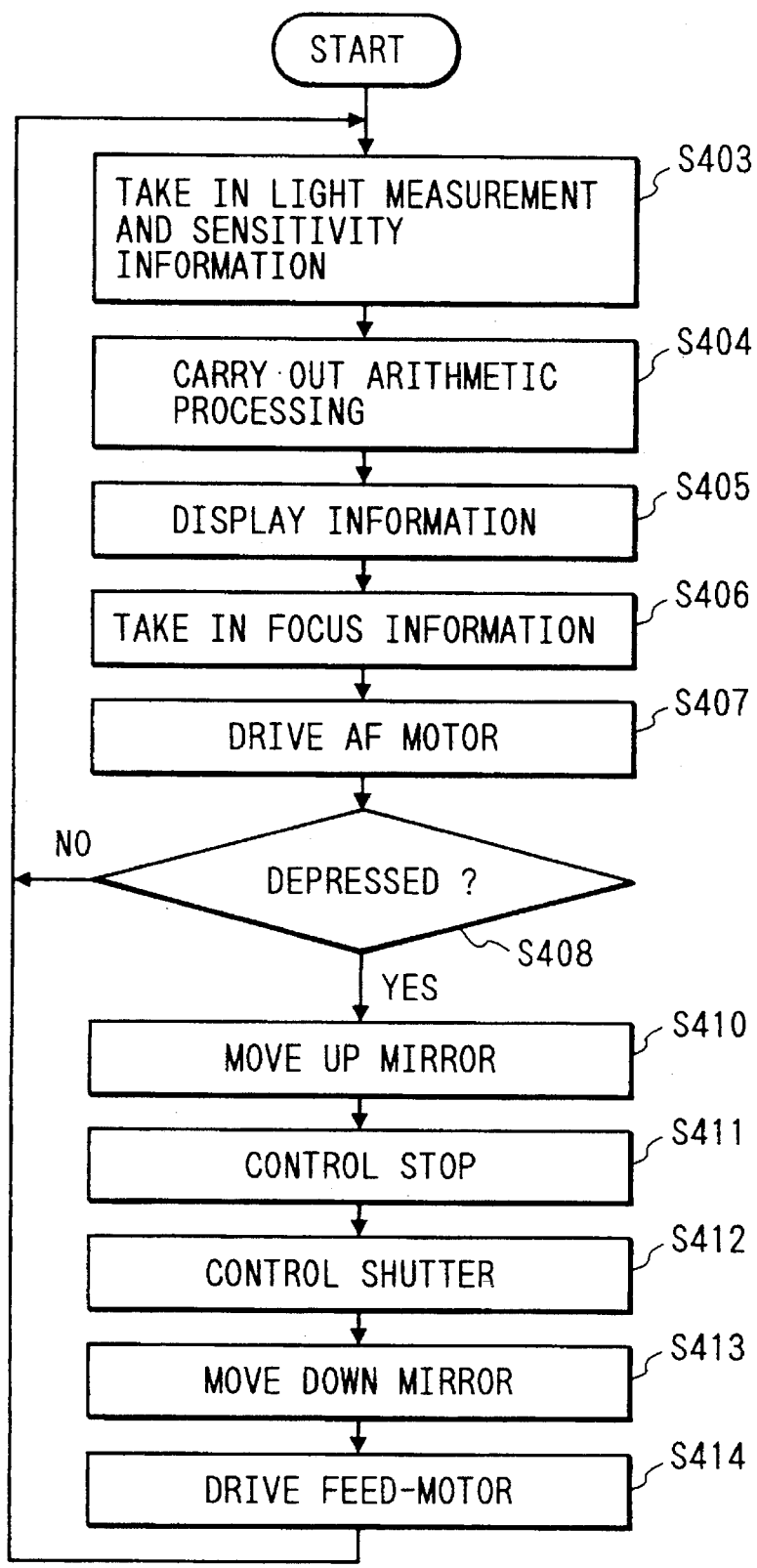
FIG. 21 is a flowchart showing a processing routine by the CPU in FIG. 17.

FIG. 21 shows a processing routine by the CPU 28C in FIG. 17.

This routine is executed based on the processing programs stored in the FM 32 and also repeatedly carried out during a supply of the electric power. Note that steps S403 to S408 and S410 to S414 are the same as steps S103 to S108 and S110 to S114 in FIG. 5, and hence their repetitive explanations are omitted.

Figure 22:
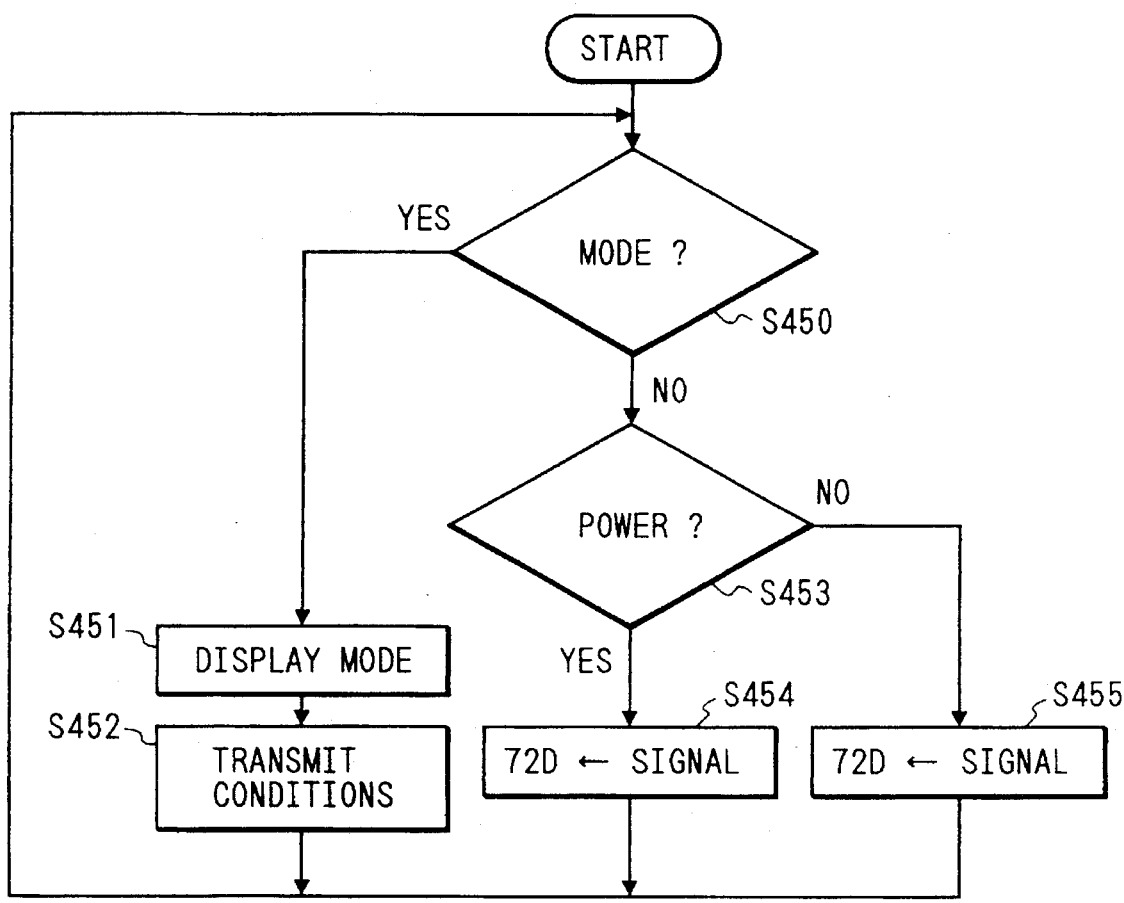
FIG. 22 is a flowchart showing a processing routine by the CPU in FIG. 18.

The processing operation by the CPU 76 within the remote control 70 will be described with reference to FIG. 22 showing a processing routine thereof. This operation is repeatedly carried out while a battery 78 is connected to the CPU 76 via an unillustrated power switch.

The CPU 76 detects an operating state of an operation switch 74 and effects processing corresponding to the detected operating state. The remote-controllable operation by the operation switch 74 is itemized such as setting of the photographing mode, ON/OFF operations of the power supply of the camera and the release operation of the camera.

Determined is whether or not the photographing mode and the photographing conditions are set and changed (step S450). If the answer is Yes, the set photographing mode is displayed on the LCD 73 (step S451), and, at the same time, the set conditions are transmitted to the camera 1 (step S452). Whereas if the answer is No, there is determined whether or not the power-ON is commanded (step S453). If the answer is Yes, a power-ON signal is transmitted via the terminal 72D to the camera 1B (step S454). Whereas if the answer is No, it is determined that the release operation is commanded, and a release signal is transmitted via the terminal 72D to the camera 1B (step S455).

After steps S452, S454 or step S455, the operation returns to step S450, wherein the same processing is repeated.

Figure 23:
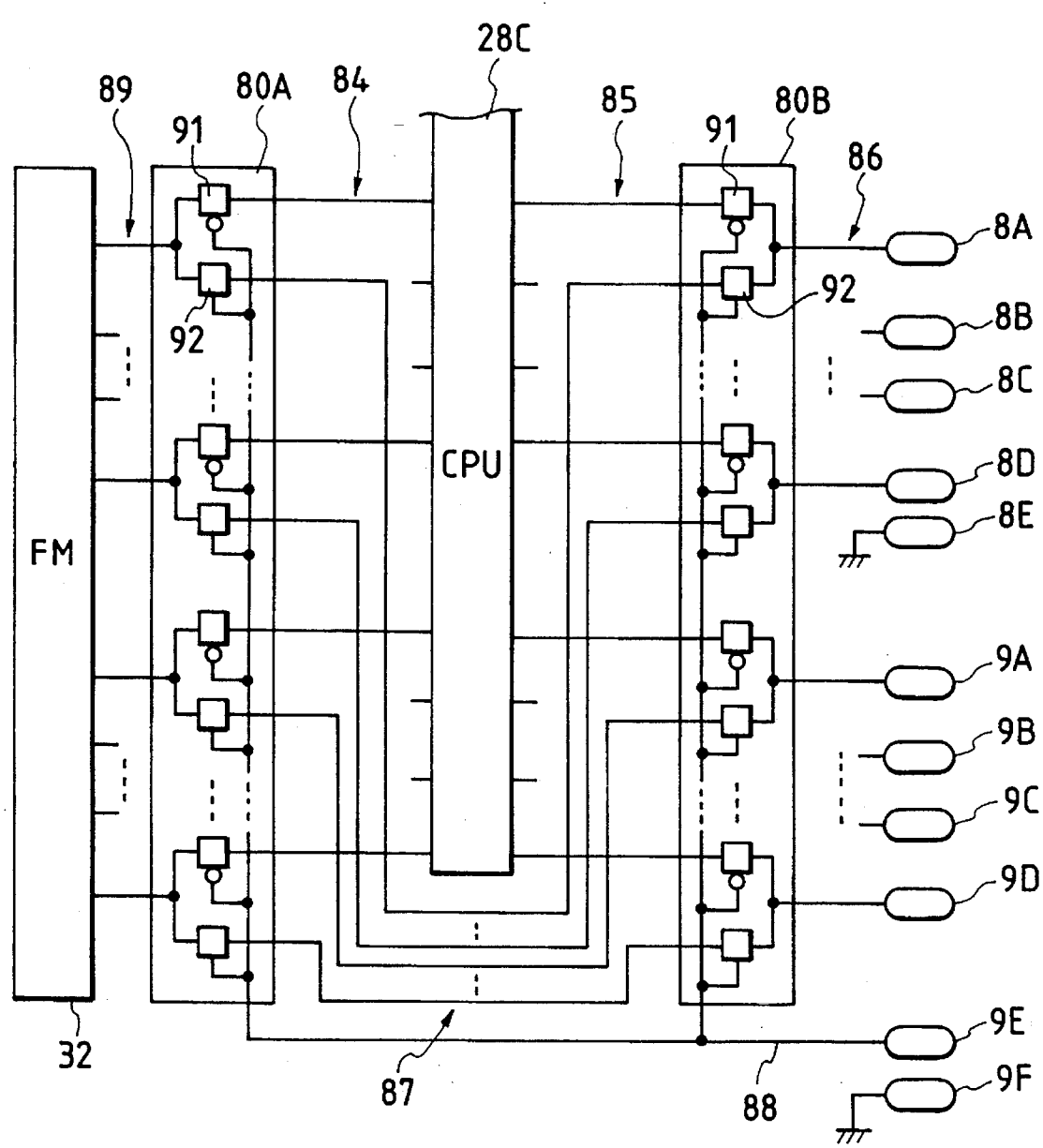
FIG. 23 is a partial block diagram illustrating an example of modification of a terminal portion in the electric circuit shown in FIG. 17.

In the fourth embodiment (FIGS. 16 to 22) discussed above, the string-of-terminal 9 is made to serve as a connection terminal of the remote control 70 and a connection terminal of the rewrite device 50C. If the FM 32 (or the rewrite device 50C) requires a larger number of connection terminals, however, it is, as a matter of course, possible to employ even other strings of terminals of the camera 1B's own as the connection terminals of the rewrite device 50C in addition to the string-of-terminal 9. For example, both of the string-of-terminal 9 and the string-of-terminal 8 may be used. FIG. 23 illustrates such an example.

This example of FIG. 23 presents an arrangement in which the programs are transferred through totally eight pieces of terminals, i.e., the terminals 8A to 8D plus the terminals 9A to 9D. As a matter of course, the terminals 8A to 8D are also, as in the same way with the terminals 9A to 9D, so constructed as to be alternatively connectable to one of the CPU 28C and the FM 32 by the changeover switches 80A, 80B. The changeover signal 88 involves only one terminal 9E as in the above-discussed embodiment.

Figure 24:
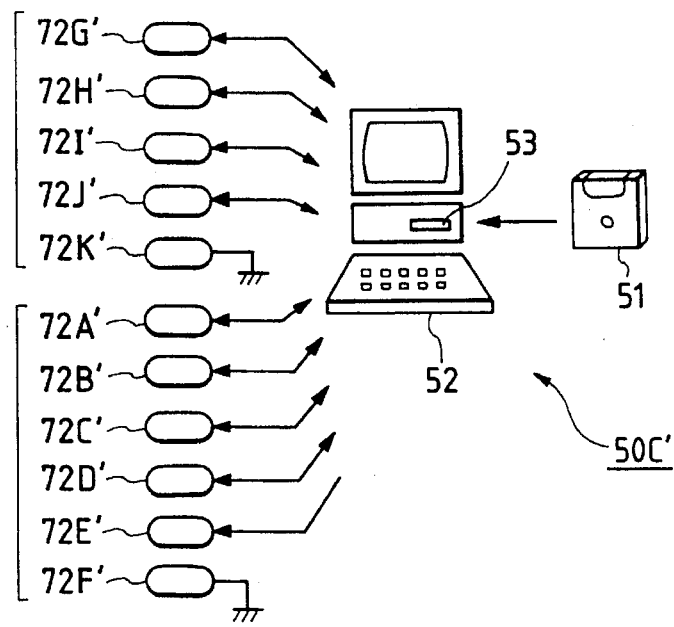
FIG. 24 is a conceptual diagram showing a rewrite device suitable for the electric circuit shown in FIG. 23.

FIG. 24 depicts a rewrite device 50C' corresponding thereto. The rewrite device 50C' has two strings of terminal (terminals 72A' to 72F' and terminals 72G' to 72K'). The terminals 72A' to 72F' are connected to the string-of-terminal 9 of the camera 1B. The terminals 72G' to 72K' are connected to the string-of-terminal 8.

With this arrangement, the string-of-terminals consisting of the terminals 8A to 8D and the terminals 9A to 9D (and the signal lines leading thereto) are conceived as one parallel data bus, and the programs can be transferred based on a parallel method. Note that the string-of-terminal 8 and the string-of-terminal 9 are spaced away from each other in terms of their positions, and, therefore, the string-of-terminal composed of the terminals 72A' to 72F' and the string-of-terminal composed of the terminals 72G' to 72K' are not unified but may be divided according to two pieces of connectors.

Note that FIG. 23 illustrates the changeover switches 80A, 80B in a form more approximate to an actual configuration than in FIG. 17. Each switching element of the changeover switches 80A, 80B includes semiconductor-based transmission gates 91, 92. Each of the gates 91, 92 is switched ON or OFF by control signals opposite to each other in terms of their phases. When the camera 1B is in a normal using state, the changeover signal is not transmitted from the terminal 9E, and hence the gate 91 is switched ON, whereas the gate 92 is switched OFF. As in the same way with FIG. 17, the FM 32 is in the state of being connected to the CPU 28C. On the other hand, during the erasing/rewriting operation by the rewrite device 50C', the changeover signal is inputted to the terminal 9E, and hence the gate 91 is switched OFF, whereas the gate 92 is switched ON. The FM 32 is connected directly to the rewrite device 50C' via the string-of-terminals 8, 9.

Figure 25:
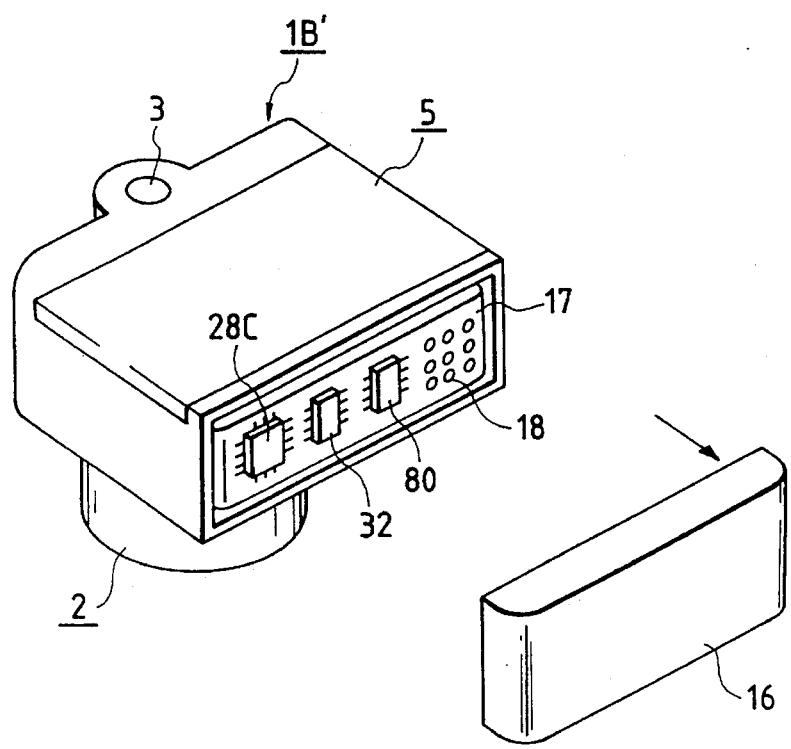
FIG. 25 is a perspective view illustrating an example of modification of the camera illustrated in FIG. 16.

In the embodiment discussed so far, the string-of-terminals 8, 9 for connecting the accessories (databack, remote control) are used also as the terminals for connecting the rewrite device 50C by providing the changeover switches 80A, 80B into the interior of the camera. As a matter of course, however, the terminals dedicated to the rewrite device 50C may also be provided. FIG. 25 illustrates such an example. FIG. 25 is a perspective view of a camera 1B' but illustrates a state where a bottom cover 16 is removed. The camera 1B' is structured such that there is exposed a part of a printed circuit board 17 on the bottom surface thereof, wherein the CPU 28C, the FM 32 and the changeover switch 80 are soldered to the printed circuit board 17. Then, this circuit board 17 is provided with a string-of-terminal 18 dedicated to the rewrite device 50C. Updating the programs within the FM 32 may involve taking off the bottom cover 16 and connecting contact terminals extended from the rewrite device 50C to the string-of-terminal 18. The bottom cover 16 is so constructed as to be easily removed by using a tool. Accordingly, even when attaching or detaching the bottom cover 16, readjustments of the respective elements are not required. The dedicated terminal may be, as a matter of course, installed in a place other than the bottom portion of the camera.

Figure 26:
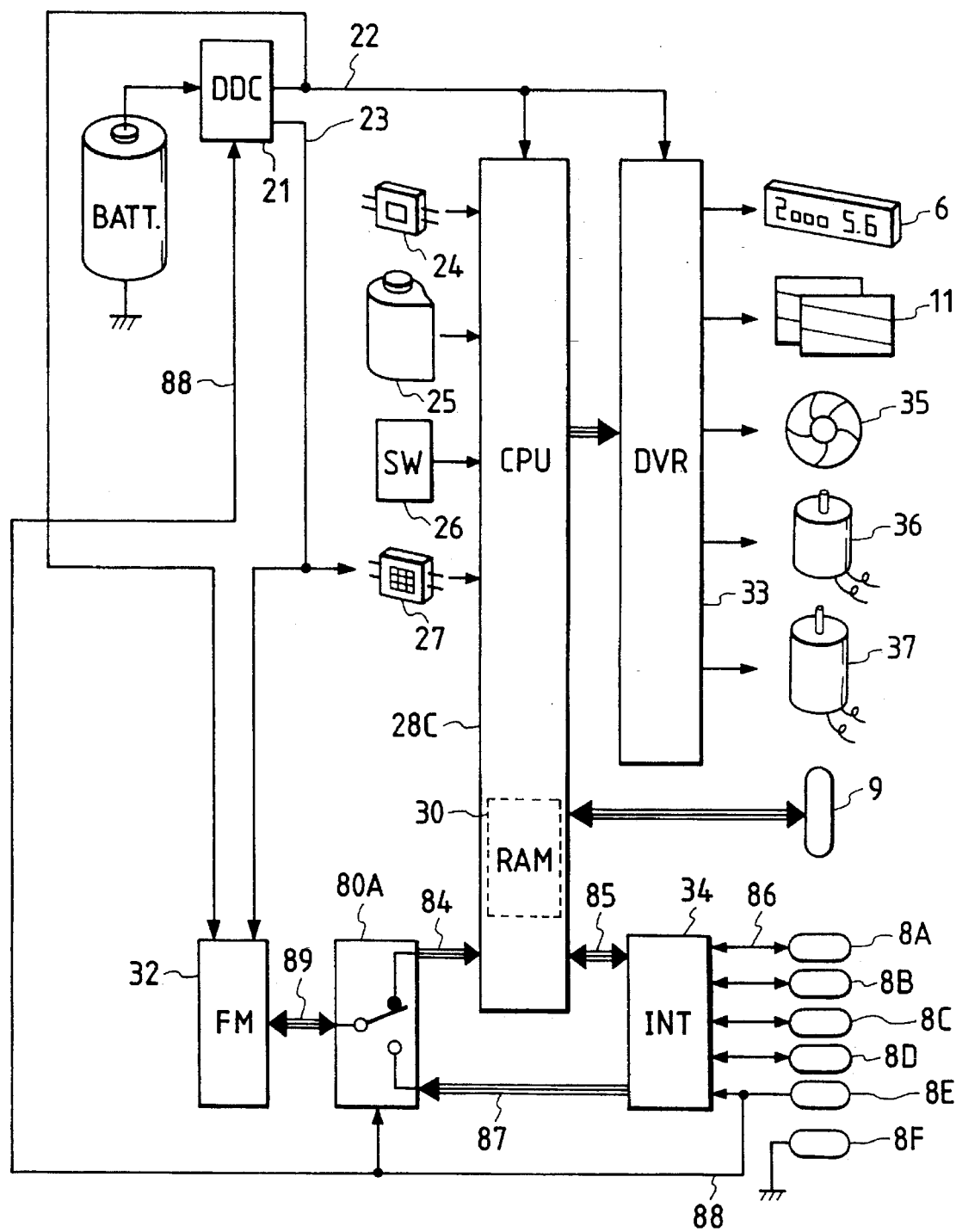
FIG. 26 is a block diagram illustrating an electric circuit in a fifth embodiment of the camera according to this invention.

FIG. 26 illustrates an electric circuit in a fifth embodiment of the present invention. This circuit is applied to the camera 1B shown in FIG. 16 and comprises the DC/DC converter 21, the light metering unit 24, the film sensitivity detection unit 25, the switch detection unit 26, the focus detection unit 27, the CPU 28C, the driver 33, the LCD 6, the shutter 11, the stop 35, the motors 36, 37, the string-of-terminal 8, the flash memory (FM) 32, the changeover switch 80A and the interface circuit 34.

The string-of-terminal 8 is employed for transferring and receiving the data-record signal to and from the databack 5 and, at the same time, serves as terminals for writing the data to the FM 32 in this embodiment. The string-of-terminal 8 in this embodiment has six pieces of terminals, but the number of the terminals is not confined to 6.

The FM 32, the CPU 28C and the string-of-terminal 8 are so constructed as to be connectable to each other through the changeover switch 80A, the interface circuit 34 and the signal lines 84, 85, 86, 87, 89.

Figure 27:
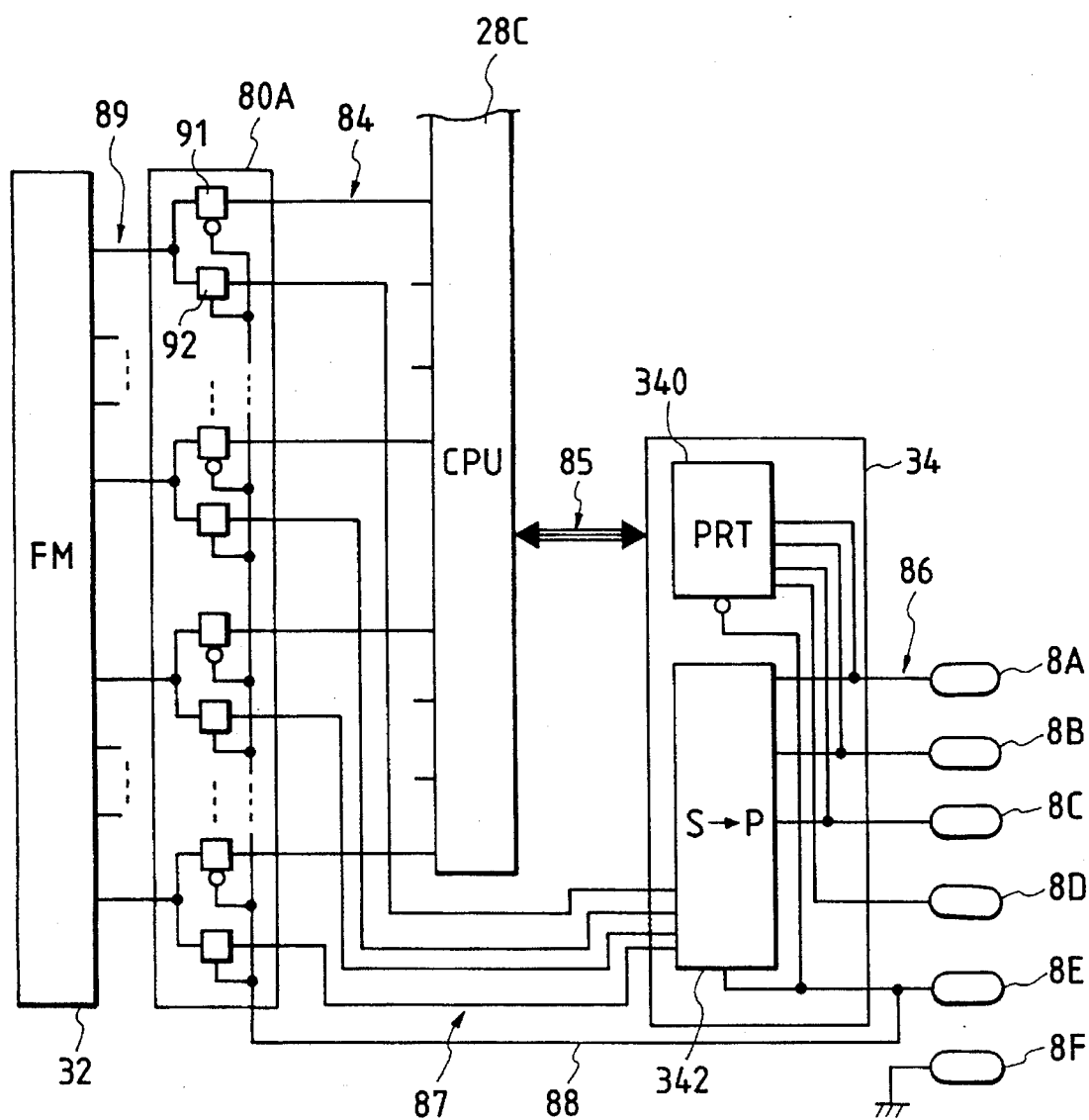
FIG. 27 is a block diagram illustrating details of an interface unit and a changeover switch in the electric circuit shown in FIG. 26.

The changeover switch 80A is constructed to switch over the internal circuit in conformity with a command (herein, a signal inputted via the terminal 8E and the signal line 88) from outside. The changeover switch 80A is also constructed to alternatively connect one of the CPU 28C and the interface circuit 34 to the FM 32. Referring to FIG. 26, the changeover switch 80A is illustrated as a mechanical switch but, actually as shown in FIG. 27, realized by use of a bidirectional switching element composed of a plurality of semiconductor switches. The changeover switch 80A is constructed of changeover circuits each composed of a pair of transmission gates 91, 92, wherein the number of the changeover circuits corresponds to the number (herein, 8) of the signal lines. The transmission gates 91, 92 are ON/OFF-controlled in an antiphase relationship with each other, corresponding to a voltage appearing on the signal line 88.

The interface circuit 34 comprises, as depicted in FIG. 27, a PRT 340 and a serial/parallel converting circuit 342 that are connected to the string-of-terminal 8 in a parallel-to-each-other connecting relationship.

The PRT 340 is an interface circuit for transferring and receiving the data to and from the databack 5 via the terminals 8A to 8D. The PRT 340 is connected via the signal line 85 to the CPU 28C.

The serial/parallel converting circuit 342 converts serial signals inputted from the terminals 8A to 8C into 8-bit parallel signals in accordance with the signal lines 87, 89 (viz., in accordance with the FM 32).

The serial/parallel converting circuit 342 and the PRT 340 are constructed so that one of them is alternatively brought into an operating status in accordance with the signal inputted from the terminal 8E. Accordingly, the changeover signal is inputted to the terminal 8E, and the interface circuit 34 is connected to the FM 32. At the same time, the serial/parallel converting circuit 342 is set in the operating status, thereby making it possible to connect the string-of-terminal 8 to the FM 32. Further, simultaneously with this processing, the PRT 340 is put into a non-operating status, and the CPU 28C is so constructed as to be electrically disconnectable from the FM 32 and the string-of-terminal 8 as well.

Each of the signal lines 84, 87, 89 is constructed of eight signal line elements. The signal line 85 is constructed of four signal line elements. The signal line 88 is constructed of a single signal line element. The specific configuration is not, however, limited to the above-mentioned.

Figure 28:
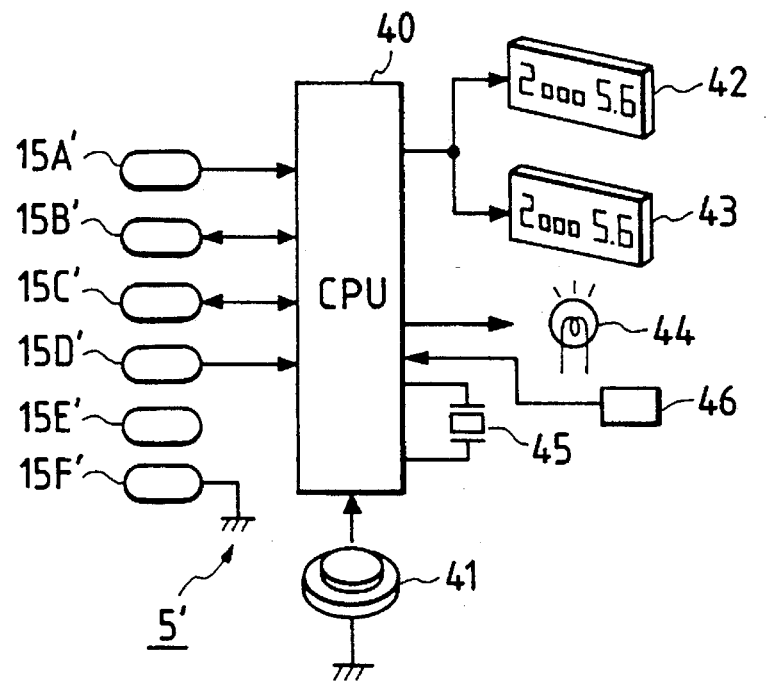
FIG. 28 is a block diagram illustrating an example of modification of the electric circuit within the databack shown in FIG. 3.

FIG. 28 depicts an electric circuit of a databack in accordance with the fifth embodiment of the present invention. A databack 5' shown in FIG. 28 is much the same as the databack 5 shown in FIG. 3 except an arrangement that a terminal 15E' is not used for transferring and receiving the signal, and a terminal 15F' is grounded. The repetitive explanation will be therefore omitted.

Figure 29:
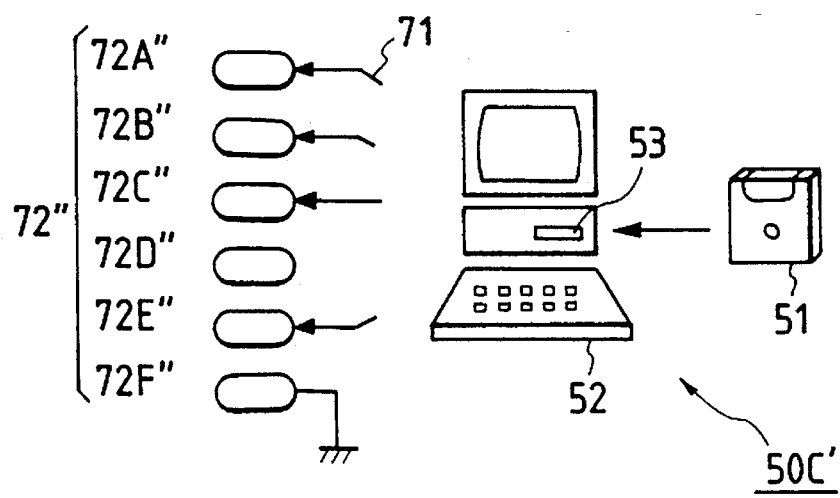
FIG. 29 is a conceptual diagram illustrating a program rewrite device in the fifth embodiment of the camera according to this invention.

FIG. 29 illustrates a program rewrite device in accordance with the fifth embodiment of the present invention. The rewrite device 50C' shown in FIG. 29 is much the same as the rewrite device 50C shown in FIG. 19 except an arrangement that a terminal 72D" is not used, and its repetitive explanation will be omitted.

Next, there will be described the operation within the camera 1B when normally used and when rewriting the program within the FM 32.

In the normal using state (inclusive of the mounting state of the databack 5'), no signal is inputted to the terminal 8E of the string-of-terminal 8, and hence the PRT 340 is in the operating status, while the serial/parallel converting circuit 342 is in the non-operating status. Further, the changeover switch 80A works to connect the CPU 28C to the FM 32. Accordingly, the databack 5' and the CPU 28C are capable of performing proper data communications with each other. Also, the CPU 28C is capable of reading the programs and the data from the FM 32.

When the rewrite device 50C' is connected to the string-of-terminal 8, the changeover signal appears on the signal line 88. Hereupon, the DC/DC converter 21 starts supplying the FM 32 with the electric power needed when rewriting the program. The FM 32 is thereby brought into a content-rewritable status. Further, the changeover switch 80A is changed over to connect the FM 32 to the serial/parallel converting circuit 342. The serial/parallel converting circuit 342 itself is put into the operating status, while the PRT 340 is brought into the non-operating status. The serial/parallel converting circuit 342 converts, into parallel signal, new items of program data transferred by the serial method from the rewrite device 50C' via the string-of-terminal 8. The thus converted parallel signals are stored in the FM 32 through the changeover switch 80A and the signal line 89.

Of course, in this state, the CPU 28C is isolated from the FM 32 and the string-of-terminal 8. For this reason, the rewrite processing to the FM 32 undergoes no influence by the operating status of the CPU 28C. Reversely, the program rewriting signal exerts no adverse influence on the CPU 28C.

Simply, the arrangement may be given so that only one of (signal line 85—PRT 340) and (signal line 87 serial/parallel converting circuit 342) is alternatively set in the connected state. In this case, The PRT 340 and the serial/parallel converting circuit 342 themselves may operate irrespective of a state of the signal appearing on the signal line 88.

Figure 30:
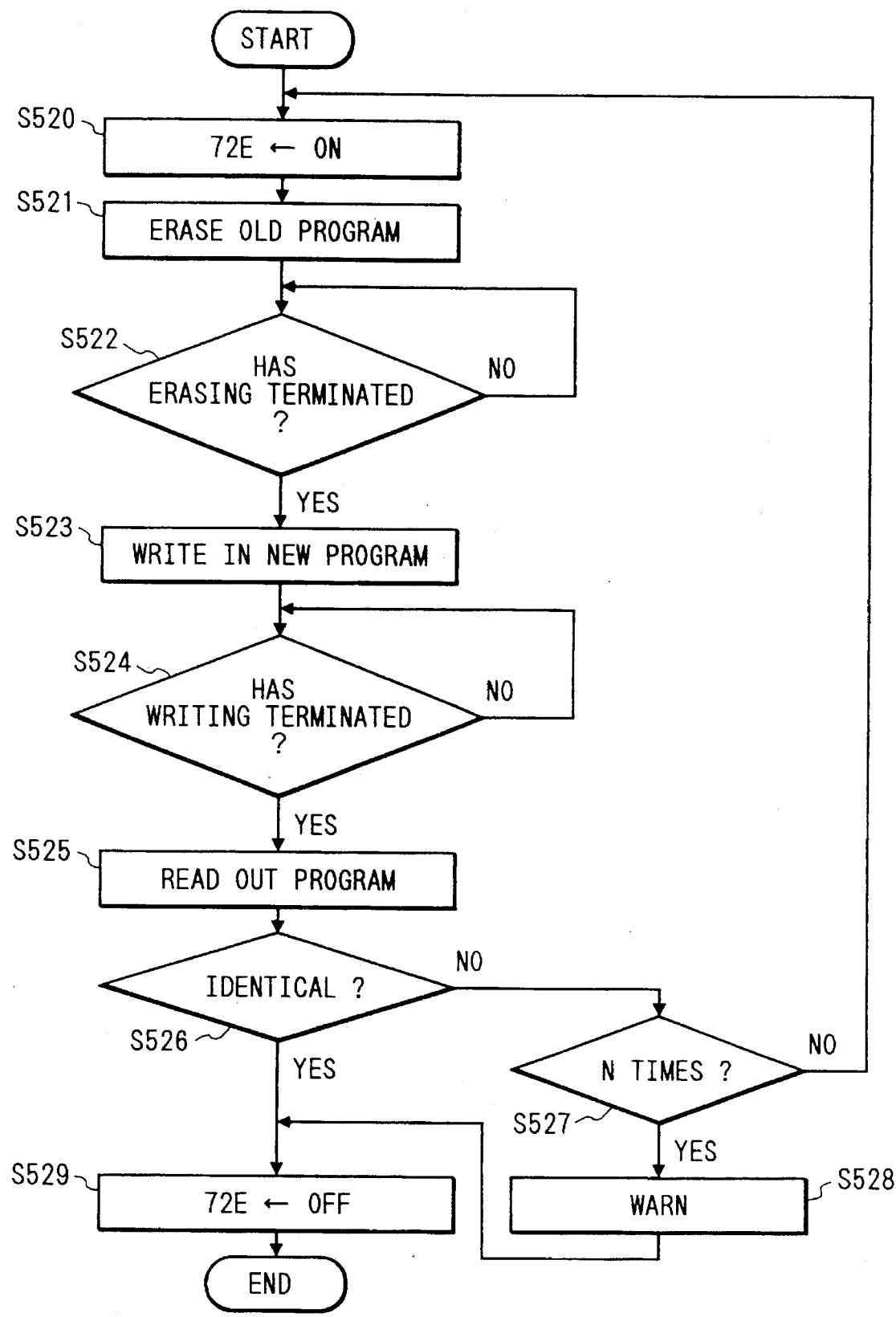
FIG. 30 is a flowchart of a program but shows a processing routine of the rewrite device in the fifth embodiment of camera according to the present invention.

Next, the operation of the rewrite device 50C' will be explained with reference to a flowchart of FIG. 30 showing a processing routine thereof.

The user, at first, connects a string-of-terminal 72" to the string-of-terminal 9, thus connecting the rewrite device 50C' to the camera 1B. Thereafter, the user causes the personal computer 52 to execute the program stored on the FD 51. A rewrite command and the processing program are sent to the camera 1B from the external output terminals 72A" to 72E", thereby performing the following processing.

The rewrite device 50C' outputs the changeover signal via the terminal 72E" (step S520). The changeover signal is transmitted via the signal line 88 to the DC/DC converter 21 which is in turn started. As a result, there is started a supply of the electric power to the FM 32 via the voltage output 23. Further, the changeover switch 80A is changed over in accordance with the changeover signal, whereby the FM 32 is connected to the signal line 87. Moreover, the interface circuit 34 is brought into the operating status. In consequence of this, it follows that the FM 32 is connected directly to the rewrite device 50C' through the string-of-terminals, 8, 72". Note that the FM 32 is, concomitantly with this processing, isolated from the CPU 28C.

Subsequently, the rewrite device 50C' indicates the FM 32 to erase the previous processing program within the FM 32 (step S521). Then, the rewrite device 50C' is kept in a standby status till the FM 32 completes the erasing operation in accordance with the above indication (step S522). Incidentally, in this embodiment, after the standby status has continued for a predetermined time enough to surely effect the erasure without confirming whether or not the erasing operation is actually completed, the operation automatically proceeds to next processing.

The rewrite device 50C' reads a new program from the FD 51 and starts processing to output this program from the terminals 72A" to 72D" (step S523). The relevant program is converted into the parallel signals by the serial/parallel converting circuit 342 and thereafter transmitted to the FM 32 through the signal line 87, the changeover switch 80A and the signal line 89.

When finishing the transfer of the program (step S524), the new processing program stored in the FM 32 at that time is reread this time (step S525). Then, there is determined whether or not the read program coincides with the original program within the FD 51 (step S526). If coincident with each other, it is determined that the program is correctly written, and the rewrite device 50C' finishes the processing by setting the changeover signal outputted to the terminal 72E" in an OFF status (step S529). Hereupon, the changeover switch 80A operates, whereby the rewrite device 50C' is disconnected from the FM 32. The FM 32 is again connected to the CPU 28C. Further, the serial/parallel converting circuit 342 is put into the non-operating status.

In step S526, whereas if the two programs are not coincident with each other, the rewrite device 50C' confirms the number of the erasing/rewriting processes performed. Determined is whether or not this reaches a predetermined limit number of times (herein, N times) (step S527). If this does not reach the limit number of times (N times), the operation goes back to step S520, wherein the processing is again performed. Whereas if this reaches the limit number of times, the user is notified of the fact that the correct program could not be written by issuing a warning on the rewrite device 50C' (step S528). Thereafter, the operation proceeds to step S529 to finish the processing. Note that the limit number of times is set to 3 in this embodiment.

FIG. 31 shows a processing routine by the CPU 28C in FIG. 26.

This routine is executed based on the processing programs stored in the FM 32 and also repeatedly carried out during a supply of the electric power. Note that steps S503 to S508 and S510 to S514 are the same as steps S103 to S108 and S110 to S114 in FIG. 5, and hence their explanations are omitted.

In the embodiments discussed above, the flash memory is employed as an example of the electrically erasable and programmable memory having the large capacity. However, storage mediums exclusive of the flash memory may be used on condition that they have a capacity enough to store the processing programs of the CPU and are capable of erasing and rewriting the processing programs through the predetermined terminals from outside of the camera. For instance, a FRAM (ferroelectric memory) may also be employed. In this case, the RAM is unnecessary for the CPU. Further, the photographing data or the like can be saved in the form of proper signals. With this savings, the photographing data or the like are read as the electric signals later on and can be managed by use of other electronic instruments.

Therefore, it is intended that the invention not be limited to the preferred embodiments described above, but that the invention will include all embodiments falling within the scope of the appended claims.

What is claimed is:

1. A camera comprising:

a microcomputer;

an electrically erasable and programmable large-capacity memory for storing a control program for indicating an operation of said microcomputer; and a terminal, exposed to outside, through which at least one of commands and program data relative to erasing and rewriting to said large-capacity memory is transmitted.

2. A camera according to claim 1, wherein said microcomputer has a read-only memory which stores the control program for indicating a transfer of at least one of the received commands and program data to said large-capacity memory but is separate from said large-capacity memory.

3. A camera comprising:

a microcomputer incorporating an electrically erasable and programmable large-capacity memory area for storing a control program for indicating an operation; and a terminal, exposed to outside, through which at least one of commands and program data relative to erasing and rewriting to said large-capacity memory area is transmitted.

4. A camera according to claim 3, wherein said microcomputer has a read-only memory area which stores the control program for indicating a transfer of at least one of the received commands and program data to said large-capacity memory area.

5. A camera comprising:

a microcomputer;

an electrically erasable and programmable large-capacity memory for storing a control program for indicating an operation of said microcomputer;

a terminal, exposed to outside, through which at least one of commands and program data relative to erasing and rewriting to said large-capacity memory is transmitted; and a power supply circuit used, when performing photography, for the operation of said microcomputer and a reading operation from said large-capacity memory and also used for supplying the electric power needed when writing at least one of the commands and the program data to said large-capacity memory.

6. A camera according to claim 5, wherein switching means brought into a conductive status only when writing at least one of the commands and the program data to said large-capacity memory is provided between said power supply circuit and a power supply terminal of said large-capacity memory.

7. A camera according to claim 6, wherein said switching means is non-conductive status during a normal operation of said camera.

8. A camera according to claim 5, wherein said terminal exposed to outside serves as an accessary connecting terminal.

9. A camera comprising:

a microcomputer;

an electrically eras:able and programmable large-capacity memory for storing a control program for indicating an operation of said microcomputer;

a terminal, exposed to outside, through which at least one of commands and program data relative to erasing and rewriting to said larvae-capacity memory is transmitted; and a power supply terminal required for erasing and rewriting to said large-capacity memory.

10. A camera comprising:

a microcomputer;

an electrically erasable and programmable large-capacity memory for storing a control program for indicating an operation of said microcomputer;

a terminal, exposed to outside, through which at least one of commands and program data relative to erasing and rewriting to said large-capacity memory is transmitted;

means for detecting whether or not there exists a power supply needed for erasing and rewriting to said large-capacity memory; and means for controlling the erasing and rewriting to said large-capacity memory in accordance with an output of said detecting means.

11. A camera comprising:

a microcomputer;

an electrically erasable and programmable large-capacity memory for storing a control program for indicating fundamental processing of said microcomputer;

a small-capacity memory for storing a processing instruction relative to the erasing and rewriting to said large-capacity memory; and a terminal, exposed to outside, through which at least one of commands and program data relative to erasing and rewriting to said large-capacity memory is transmitted.

12. A camera comprising:

a microcomputer;

an electrically erasable and programmable large-capacity memory for storing a control program for indicating a part of fundamental processing of said microcomputer;

a small-capacity memory for storing a processing instruction relative to erasing and rewriting to said large-capacity memory and a control program for indicating a part of remaining fundamental processing of said microcomputer; and a terminal, exposed to outside, through which at least one of commands and program data relative to the erasing and rewriting to said large-capacity memory is transmitted.

13. A camera comprising:

a microcomputer;

a memory for temporarily storing data inputted and outputted to said microcomputer;

an electrically erasable and programmable large-capacity memory for storing a control program for indicating an operation of said microcomputer;

a terminal, exposed to outside, through which at least one of commands and program data relative to erasing and rewriting to said large-capacity memory; and a read-only memory for storing, after said temporary storage memory has temporarily stored at least one of the inputted commands and the inputted program data, a sequence of transferring and storing one of them to and in said large-capacity memory.

14. A camera according to claim 13, wherein the electric erasing and rewriting to said large-capacity memory are performed by use of any one of an external power supply or a power supply built in said camera.

15. A camera having photographing means, a photographing operation of which is controlled, said camera comprising:

storage means for storing control data for instructing at least the photographing operation;

control means for controlling said photographing means in accordance with the control data by reading the control data;

a connecting portion for a connection to an external circuit; and selecting means for selectively connecting said storage means to at least one of said connecting portion and said control means.

16. A camera according to claim 15, further comprising connection detecting means for detecting the connection of said external circuit to said connecting portion, wherein said connecting portion includes a plurality of terminals, and said selecting means changes a connection target in accordance with a result of the detection by said detecting means.

17. A camera according to claim 15, wherein said selecting means changes the connection target in accordance with a signal inputted to a certain specified terminal conceived as a predetermined terminal among said terminals.

18. A camera according to claim 17, wherein said storage means is so constructed as to be operable with the signal inputted through said specified terminal serving as a power supply.

19. A camera according to claim 15, wherein said storage means is capable of electrically repeatedly rewriting the control data.

20. A camera according to claim 15, wherein said storage means is capable of batch-erasing contents stored therein.

21. A camera according to claim 15, wherein said storage means is a flash memory.

22. A camera according to claim 15, wherein said connecting portion includes a plurality of terminals disposed separately in at least two or more areas.

23. A camera according to claim 15, wherein said camera is so constructed as to be connectable to at least one of a remote control device for remote-controlling said camera and a databack device for recording a desired item of data on a film, and said connecting portion for the connection to said external circuit serves as at least one of a connecting portion for a connection to said remote control device and a connecting portion for a connection to said databack.

24. A camera according to claim 15, wherein said connecting portion is so disposed as to be exposed to outside.

25. A camera according to claim 15, further comprising an openable/closable cover member for covering said connecting portion.

26. A camera according to claim 19, further comprising an externally controllable built-in power supply, said built-in power supply being used for rewriting the control data in said storage means.

27. A camera according to claim 15, further comprising a removable cover member for covering said connecting portion.

28. A camera according to claim 23, wherein said connecting portion for the connection to said external circuit is constructed of a plurality of terminals employed also as accessary terminals.

29. A camera according to claim 17, wherein said selecting means is constructed of an analog switch.

30. A camera having photographing means, a photographing operation of which is controlled, said camera comprising:

storage means for inputting and outputting data in parallel in order to store control data for instructing at least the photographing operation;

control means for controlling said photographing means in accordance with the control data by reading the control data;

a connecting portion for a connection to an external circuit; and serial/parallel converting means for converting a serial signal inputted and outputted via said connecting portion into a parallel signal and outputting the parallel signal to said storage means.

31. A camera according to claim 30, further comprising selecting means for selectively connecting said connecting portion to one of said storage means and said control means.

32. A camera according to claim 31, further comprising connection detecting means for detecting the connection of said external circuit to said connecting portion, wherein said connecting portion is constructed of a plurality of terminals, and said selecting means changes a connecting target in accordance with a result of the detection by said detecting means.

33. A camera according to claim 31, wherein said selecting means changes the connecting target in accordance with a signal inputted to a certain specified terminal conceived as a predetermined terminal among said terminals.

34. A camera according to claim 33, wherein said storage means is so constructed as to be capable of the rewriting operation with the signal inputted via the specified terminal serving as a power supply.

35. A camera according to claim 31, wherein said camera is so constructed as to be connectable to at least one of a remote control device for remote-controlling said camera and a databack device for recording a desired item of data on a film, and said connecting portion for the connection to said external circuit serves as at least one of a connecting portion for a connection to said remote control device and a connecting portion for a connection to said databack.

36. A camera according to claim 31, wherein said connecting portion is so disposed as to be exposed to outside.

37. A camera according to claim 31, wherein said storage means is capable of electrically repeatedly rewriting the control data.

38. A camera according to claim 31, wherein said storage means is capable of batch-erasing contents stored therein.

39. A camera according to claim 31, wherein said storage means is a flash memory.

40. A camera with a microcomputer and a databack, comprising:

an electrically erasable and programmable flash memory storing a control program controlling an operation of said microcomputer; and a string-of-terminals receiving data from said databack or commands and data from an external device for erasing and rewriting the control program stored in said flash memory.

41. A camera according to claim 40, wherein a terminal in said string-of-terminals receives an external power supply for erasing and rewriting said flash memory.

42. A camera according to claim 40, further comprising a power supply circuit supplying power to said microcomputer and to said flash memory during a reading operation on said flash memory or during erasing and rewriting of said flash memory.

43. A camera with a microcomputer and a databack, comprising:

an electrically erasable and programmable flash memory storing a control program controlling an operation of said microcomputer;

a first string-of-terminals receiving data from said databack or commands and data from an external device for erasing and rewriting the control program stored in said flash memory; and, a second string-of-terminals, externally exposed, receiving command and data from the external device for erasing and rewriting the control program stored in said flash memory.

44. A camera with a microcomputer and a databack, comprising:

an electrically erasable and programmable flash memory storing a control program controlling an operation of said microcomputer; and a string-of-terminals receiving data from external accessories or data from said databack or commands and, data from an external device for erasing and rewriting the control program stored in said flash memory.

* * * * *

UNITED STATES PATENT AND TRADEMARK OFFICE
CERTIFICATE OF CORRECTION

PATENT NO. : 5,565,957
DATED : October 15, 1996
INVENTOR(S) : Tetsuro GOTO

It is certified that error appears in the above-indentified patent and that said Letters Patent is hereby corrected as shown below:

Column 27, line 38 (claim 9), "eras:able" should be --erasable--;

Column 27, line 43 (claim 9), "larvae-capacity" should be --large-capacity--;

Column 30, line 63 (claim 44), "and," should be --and--.

Signed and Sealed this

Eleventh Day of March, 1997

*Attest:*

BRUCE LEHMAN

*Attesting Officer*      *Commissioner of Patents and Trademarks*